United States Patent
Chun et al.

(10) Patent No.: US 7,079,867 B2
(45) Date of Patent: Jul. 18, 2006

(54) SEMI-BLIND TRANSMIT ANTENNA ARRAY DEVICE USING FEEDBACK INFORMATION AND METHOD THEREOF IN A MOBILE COMMUNICATION SYSTEM

(75) Inventors: Byung-Jin Chun, Suwon-shi (KR); Jin-Ho Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 783 days.

(21) Appl. No.: 09/802,165

(22) Filed: Mar. 8, 2001

(65) Prior Publication Data
US 2002/0000948 A1    Jan. 3, 2002

(30) Foreign Application Priority Data
Mar. 8, 2000    (KR) ...................... 10-2000-0011617

(51) Int. Cl.
*H04B 1/38*    (2006.01)
(52) U.S. Cl. ................ 455/562; 455/277.1; 455/278.1; 455/279.1; 455/303; 370/342; 370/335; 342/378; 342/828; 342/850; 342/853
(58) Field of Classification Search ................ 455/562, 455/550.1, 69, 65, 62, 67.11, 522, 562.1, 455/561, 277.1, 277.2, 278.1, 279.1, 303; 343/853, 850; 370/342, 339, 335; 342/378, 342/828, 850, 853
See application file for complete search history.

(56) References Cited

U.S. PATENT DOCUMENTS 5,982,327 A * 11/1999 Vook et al. .................. 342/380
6,101,399 A *  8/2000 Raleigh et al. ............. 455/561

(Continued)

FOREIGN PATENT DOCUMENTS

WO    WO00/79702    * 12/2000

OTHER PUBLICATIONS

G.G.Raleigh and V.K. Johnes, "Adaptive Antenna Transmission for Frequency Duplex Digital Wireless Communication", in Proc. IEEE ICC, pp. 641-646, Montreal, Canada, Jun. 1997.

(Continued)

*Primary Examiner*—Charles Appiah
*Assistant Examiner*—Khawar Iqbal
(74) *Attorney, Agent, or Firm*—Dilworth & Barrese LLP

(57) ABSTRACT

There is provided a transmit antenna array device with at least two antennas and a method thereof in which a transmission beam is appropriately formed based on a weight vector to be transmitted to a specific mobile station in a mobile communication system. For this purpose, a base station device has a reverse processor for processing a reverse signal received through the antenna array, a forward fading information extraction unit for extracting forward fading information from the received reverse signal, a beam formation controller for generating a weight vector for formation of a transmission beam using the forward fading information and the received reverse signal, and a forward processor having a transmission beam generator for generating a transmission beam for a transmission message based on the weight vector. A mobile station device has a forward processor for processing a received forward signal, a forward fading estimator for estimating forward fading information of the forward signal for each path, a forwarding fading encoder for combining the estimated forward fading information and encoding the combined forward fading information, and a reverse processor for multiplexing the encoded forward fading information with a transmission message and feeding back the forward fading information in the multiplexed signal to a base station.

20 Claims, 13 Drawing Sheets

U.S. PATENT DOCUMENTS

| | | | |
|---|---|---|---|
| 6,192,256 B1 * | 2/2001 | Whinnett | 455/562.1 |
| 6,219,561 B1 * | 4/2001 | Raleigh | 455/561 |
| 6,240,098 B1 * | 5/2001 | Thibault et al. | 370/431 |
| 6,373,433 B1 * | 4/2002 | Espax et al. | 342/368 |
| 6,411,257 B1 * | 6/2002 | Sorelius et al. | 342/378 |
| 6,421,007 B1 * | 7/2002 | Owen et al. | 342/417 |
| 6,463,303 B1 * | 10/2002 | Zhao | 455/562.1 |
| 6,477,161 B1 * | 11/2002 | Hudson et al. | 370/342 |
| 6,590,532 B1 * | 7/2003 | Ogawa et al. | 342/378 |
| 6,597,678 B1 * | 7/2003 | Kuwahara et al. | 370/342 |
| 6,600,776 B1 * | 7/2003 | Alamouti et al. | 375/147 |
| 6,650,911 B1 * | 11/2003 | Kang et al. | 455/442 |
| 6,658,261 B1 * | 12/2003 | Winters et al. | 455/504 |
| 6,765,969 B1 * | 7/2004 | Vook et al. | 375/259 |
| 2003/0050016 A1 * | 3/2003 | Boros et al. | 455/67.4 |
| 2003/0072382 A1 * | 4/2003 | Raleigh et al. | 375/267 |

OTHER PUBLICATIONS

J.S. Thomoson, J.E. Hudson, P.N. Grant and B. Mulgrew, "CDMA Downlink Beamforming for Frequency Selective Cahnnels", PIMRC '99, B2-3, Osaka, Japan, Sep. 1999.

* cited by examiner

SEMI-BLIND TRANSMIT ANTENNA ARRAY DEVICE USING FEEDBACK INFORMATION AND METHOD THEREOF IN A MOBILE COMMUNICATION SYSTEM

PRIORITY

This application claims priority to an application entitled "Semi-Blind Transmit Antenna Array Device Using Feedback Information and Method Thereof in Mobile Communication System" filed in the Korean Industrial Property Office on Mar. 8, 2000 and assigned Ser. No. 2000-11617, the contents of which are hereby incorporated by reference.

BACKGROUND OF THE INVENTION

1. Field of the Invention

The present invention relates generally to an antenna array device and a method thereof in a mobile communication system, and in particular, to a device and method for forming a transmission beam.

2. Description of the Related Art

As the number of mobile subscribers drastically increases, the capacity of the mobile communication systems approaches a saturation point. This means that mobile communication systems are in need of more advanced applications to increase the system capacity, particularly the capacity of a forward link for diverse multimedia services.

The capacity of the forward link can be increased by designing an efficient transmission antenna array system If the mobile systems use only single transmit antennas, for example dipole antennas, transmission signals are propagated in all directions. In this situation, when a transmission is performed toward a desired specific mobile station through a dedicated channel, as opposed to a situation where transmission to all mobile stations is performed using a base station transmission antenna through a common channel, much of the radiation energy except radiation energy for the specified mobile station is useless and the unnecessary radiation energy becomes interference signals to other mobile stations. If the base station transmits a signal only in the direction of the specific mobile station for communication on the dedicated channel, good communication quality is ensured with low transmission power and interference to other mobile stations is decreased. Consequently, the capacity of the forward link increases.

This effect can be achieved using a plurality of antennas. A transmission/reception device related with the antennas is called a transmission antenna array system or transmission smart antenna system. While the transmit antenna array system is applicable to various mobile communication fields, it will be described here in context with CDMA cellular mobile communication for convenience sake.

The structure and operation of a transmit antenna array in the mobile communication system will be described hereinbelow.

FIG. 1 illustrates the transmission beam formation in the transmit antenna array. Referring to FIG. 1, let a transmission signal from a base station be s(t). The signal s(t) is duplicated into a plurality of identical signals, the duplication signals are multiplied by corresponding complex weights in multipliers 11l to 11L, and the resulting signals are transmitted in the air through the respective antennas. A mobile station, using a single antenna, receives the sum of the transmission signals that the base station transmits through the antennas. A direction in which each transmission signal is directed is determined by a weight multiplied by the transmission signal and the geometrical structure of the transmit antenna array. The reason for assuming that a single antenna is used in the mobile station is that the mobile station does not typically use an antenna array due to limitations of cost, size, and mobility.

Suppose a linear antenna array has L antennas as shown in FIG. 1 and each antenna has a complex weight $\omega_i$ (i=1, 2, ..., L), a signal transmitted in a direction $\theta$ is proportional to $$\underline{w}^H \underline{a}(\theta) \tag{1}$$

where $\underline{w} = [w_1 w_2 \ldots w_L]^T$ is a weight vector, $$\underline{a}(\theta) = \left[1 e^{j2\pi \frac{d\sin\theta}{\lambda}} K e^{j2\pi \frac{(L-1)d\sin\theta}{\lambda}}\right]^T$$

is an array vector, H represents Hermitian, T represents transpose, d is the distance between antennas, and $\lambda$ is the wavelength of a carrier frequency. The array vector refers to the relative strength and phase of a signal transmitted from each antenna to a remote destination in the direction $\theta$, as expressed in vectors.

$\underline{w}^H \underline{a}(\theta)$ is greatest when $\underline{w}$ and $\underline{a}(\theta)$ are in the same direction and $\underline{w}^H \underline{a}(\theta)$ is 0 when $\underline{w}$ is at a right angle with $\underline{a}(\theta)$. Therefore, the strength of a transmission signal varies according to the transmission direction $\theta$. On the same principle, a signal can be transmitted with the greatest strength in a specific direction $\theta$ by controlling $\underline{w}$.

An antenna array is different from a diversity antenna device in that it transmits a signal in a particular direction. The distance between antennas (wavelength order length) is shorter in the antenna array than in the diversity antenna device.

In general, an antenna array is provided to a base station that can accommodate a plurality of antennas and controls a transmission/reception direction with respect to a mobile station with a single antenna. The antenna array can be considered in two parts: a transmission antenna array and a reception antenna array. The transmission antenna array is focused on for description by way of example. Yet, the hardware of the antenna array is commonly used for transmission and reception.

A TDD (Time Division Duplex) system, since it uses an identical frequency band for transmission and reception, shows the same characteristics in transmission and reception and applies a weight vector obtained for a reception antenna array operation to a transmission antenna array operation as well. On the other hand, an FDD (Frequency Division Duplex) system calculates a weight vector separately for a transmission antenna array because a transmission frequency band is separated from a reception frequency band by a coherence bandwidth or greater. It is to be appreciated that the following description is made on a transmission antenna array system of an FDD system.

Blind transmission is characteristic of transmission antenna arrays that have been developed so far. The blind transmission refers to transmission without receiving any feedback information of the channel characteristics of a forward link from a mobile station. These transmission antennas operate based on the following reciprocity suppositions between transmission and reception channels.

Supposition 1: a forward fading channel and a reverse fading channel arrive at their destinations from the same number of paths and transmission and reception occur in the same path direction.

Supposition 2: if the difference between a transmission frequency band and a reception frequency band is greater than a coherence bandwidth in an FDD system, the forward and reverse channels have mutually independent instant fading coefficients but an identical average fading power for the same path.

Raleigh has suggested a blind transmit antenna array for a single fading path as shown in FIG. 2 (reference 1: G. G. Raleigh and V. K. Johnes, "Adaptive Antenna Transmission for Frequency Duplex Digital Wireless Communication," in Proc. IEEE ICC, pp. 641–646, Montreal, Canada, June 1997).

A channel vector refers to a collection of the vector-expressed characteristics of each antenna in a transmit antenna array with respect to a reception antenna. If we let a forward channel vector be $\underline{h}$, then $\underline{h}=\beta\underline{a}(\theta)$. $\beta$ is a fading coefficient independent of a reverse fading coefficient according to supposition 2, $\theta$ is a transmission direction from a base station to a mobile station, which the base station knows from a reverse signal by supposition 1 without receiving forward fading feedback information from the mobile station, and $\underline{a}(\theta)$—corrected is an array vector for the direction $\theta$.

The base station transmits a transmission message s(t) by forming a beam with a weight vector $\underline{w}$ and the message s(t) arrives at the mobile station on a forward channel $\underline{h}$. The received signal r(t) can be expressed by $$r(t)=\underline{h}^T\underline{w}s(t)+n(t) \tag{2}$$

where n(t) is additive white Gaussian noise (AWGN).

According to a matching filter theory, an optimal weight vector that brings a maximal output SNR at a receiving end of the mobile station is $$\underline{w}=\sqrt{P}\frac{\underline{h}^*}{\|\underline{h}\|} \tag{3}$$

where P is the transmission power of the base station, * is a conjugate operator, and $\|\cdot\|$ is the norm of a corresponding vector. By applying the relationship of $\underline{h}=\beta\underline{a}\theta$ to Eq. 3, $$\underline{w}=\sqrt{P}\frac{\underline{a}^*(\theta)}{\|\underline{a}(\theta)\|}. \tag{4}$$

From Eq. 4, it is noted that an optimal weight vector is set using only the transmission direction $\theta$ known from a reverse signal by supposition 1 without a fading coefficient. Because a single path is assumed, not a fading coefficient but an array vector is obtained.

Now, a description of the transmission antenna array suggested by Raleigh will be given. Referring to FIG. 2, a transmission message is propagated in the air via an antenna array 203 by a beam formed in a specific transmission direction in a transmission beam generator 202. A reverse processor 205 processes a reverse channel signal received via the antenna array 203. An array vector calculator 207 divides reversely received signals for each path through a path divider in a rake receiver of the reverse processor 205 and calculates a direction (array vector) on the basis of direction information of the received signals. A weight vector calculator 209 calculates a weight vector using the array vector and outputs the array vector to the transmission beam generator 202. The transmission beam generator 202 controls generation of a transmission beam by assigning a weight to a transmission signal that is to be output via a corresponding antenna based on the weight vector.

The above transmission antenna array system estimates the reception direction of a signal received via the antenna array 203, calculates a weight vector (array vector) for the transmission antenna array based on the estimated direction information, and then forms a transmission beam using the weight vector, for transmission.

Despite the advantage of simple structure, the Raleigh transmission antenna array using a single path is not feasible for a multi-path system.

Thompson has suggested a blind transmission antenna array with a multi-fading path as shown in FIG. 3 (reference 2: J. S. Thompson, J. E. Hudson, P. M. Grant, and B. Mulgrew, "CDMA Downlink Beamforming for Frequency Selective Channels," PIMRC'99, B2-3, Osaka, Japan, September 1999).

In the case of a multi-fading path (M paths), a reception direction for each path must be estimated from an input signal to form a forward transmission beam as is done in the case of a single path. If a reception direction (a transmission direction according to supposition 1) for an ith fading path (i=1, 2, . . . , M) is $\theta_i$, a transmission beam for the ith fading path is formed in the direction of $\theta_i$. The issue is how to determine weights (different from weight vectors). Considering this issue, an optimal weight vector is determined in the following way.

Assuming that the base station transmits a transmission message by forming a transmission beam with a weight vector $\underline{w}$ and it arrives at the mobile station from three different paths on a forward channel, a signal r(t) received at the mobile station can be expressed by $$r(t)=\underline{h}_1^T\underline{w}s(t-\tau_1)+\underline{h}_2^T\underline{w}s(t-\tau_3) \tag{5}$$

where $\tau_i$ is a propagation delay for an ith path and $\underline{h}_1$ is a channel vector for an ith path. Similarly to a single path, with respect to the transmission direction $\theta_i$ and a fading coefficient $\beta_i$, $\underline{h}_1$ is as follows. Herein, the fading coefficient $\beta_I$ means a value including a phase and a size value of the received signal.

$$\underline{h}_1=\beta_i\underline{a}(\theta_1) \tag{6}$$

According to the matching filter theory, an optimal weight vector that brings a maximum output SNR at a receiving end of the mobile station is $$\underline{w}^o=\arg_{\underline{w}}{}^{max}\underline{w}^H H^H H \underline{w} \text{ subject to } \|\underline{w}\|^2=P \tag{7}$$

where $H=[\underline{h}_1\underline{h}_2\underline{h}_3]$ where P is transmission power, $w^o$ is an optimal weight vector, and $\underline{h}^1,\underline{h}_2,\underline{h}_3$ are channel vectors for the paths. The solution of Eq. 7 is set as a maximum unique vector corresponding to the maximum unique value of a transmission correlation matrix $$H^H H = \sum_{i=1}^{3}|\beta_i|^2\underline{a}(\theta_i)\underline{a}(\theta_i)^H.$$

From the foregoing, it can be noted that the base station needs to know a fading coefficient $\{\beta_i\}$ as well as a transmission direction $\{\theta_i\}$ in order to achieve the optimal weight vector. On the contrary, the base station need not know a fading coefficient to form a transmission beam for a single fading path. In an FDD environment, the instant fading coefficient of a reverse channel is different from that of a forward channel. Thus, it is no use analyzing a received reverse signal to obtain the instant fading coefficient of the forward channel.

By replacing $H^H H$ of Eq. 7 with an expectation $E[H^H H]$, Thompson proposed a semi-optimal weight vector given by $$E[H^H H] = \sum_{i=1}^{3} E[|\beta_i|^2]\underline{a}(\theta_i)\underline{a}(\theta_i)^H. \quad (8)$$

In Eq. 8, the transmission direction $\{\theta_i\}$ (the array vector $\{\underline{a}(\theta)_i\}$) is estimated from a received reverse signal according to supposition 1 and $E[|\beta_i|^2]$ is also estimated from the received reverse signal according to supposition 2.

This is blind beam formation without the need of receiving feedback information about a fading coefficient from a mobile station. However, the blind beam formation has a slightly lower performance than the non-blind beam formation using an optimal weight vector calculated by Eq. 7.

FIG. 3 is a block diagram of the transmit antenna array device suggested by Thompson. Referring to FIG. 3, a transmission message is formed into a beam by a transmission beam generator 302 of a forward processor 301 and propagated in the air in a particular direction via an antenna array 303. A reverse processor 305 processes a reverse channel signal received via the antenna array 303. A forward fading power calculator 307 estimates a fading coefficient of the received signal for each path, which is obtained by the reverse processor 305 in the course of processing the received signals and calculates the average power of the estimated fading coefficients. The reverse average fading power is calculated based on supposition 2. An array vector calculator 309 divides the received signals for each path through a path divider in a rake receiver of the reverse processor 305 and calculates the input direction (array vector) of the received signal from the received signals. A transmission correlation matrix calculator 311 obtains a transmission correlation matrix using the average fading power and the array vector and a weight vector calculator 313 calculates a weight vector using the transmission correlation matrix. The transmission beam generator 302 assigns a weight to a transmission signal that will be output via a corresponding antenna according to the weight vector received from the weight vector calculator 313, to thereby control formation of the transmission beam.

According to the Thompson transmit antenna array system, a reception antenna array first estimates the input direction (array vector) of a received signal. Then, the reception antenna array estimates a fading coefficient of the received signal for each path and calculates the average power of the fading coefficients. Based on the direction information and the average fading power information, a weight vector for a transmission antenna array is calculated. Finally, a transmission beam is formed using the weight vector and transmitted.

While the Thompson antenna array structure can be used as a transmission antenna array system in a multi-path environment, the use of an average fading power makes it impossible to calculate a precise weight vector. That is, the average fading power is used in calculating a forward fading power instead of an instant fading power. The average fading power is calculated based on supposition 2. A reverse average fading power is calculated from a received signal for use as an average forward fading power. The limitation of the Thompson antenna array in calculating a precise weight vector decreases the performance of the antenna array system

SUMMARY OF THE INVENTION

It is, therefore, an object of the present invention to provide a device and method for forming a transmission beam by calculating an optimal weight vector based on forward fading information feedback from a mobile station in a base station using a forward antenna array in a mobile communication system.

It is also an object of the present invention to provide a device and method for estimating forward fading information from a signal received on a forward channel and transmitting the forward fading information to a base station on a reverse channel in a mobile station of a mobile communication system using an antenna array.

It is another object of the present invention to provide a transmit antenna array device and a method thereof suitable for a mobile communication system where a feedback delay time is short and a mobile station roams at a movement speed that is not greatly changed.

It is a further object of the present invention to provide a transmit antenna array device and a method thereof in which a current forward fading coefficient is estimated from previous forward fading information fed back from a mobile station in a mobile communication system where a feedback delay time is great and the mobile station roams at a movement speed that is not greatly changed.

It is still another object of the present invention to provide a transmit antenna array device using a mixed forward beam formation scheme where a basic type and a blind forward beam formation type are selectively used according to the movement speed of a mobile station and a method thereof when a feedback delay time is short in a mobile station with multiple signal paths.

It is yet another object of the present invention to provide an antenna array device using a mixed forward beam formation scheme where a prediction type and a blind forward beam formation type are selectively used according to the movement speed of a mobile station and a method thereof when a feedback delay time is rather long in a mobile station with multiple signal paths.

The foregoing and other objects of the present invention are achieved by a transmit antenna array device with at least two antennas and a method thereof in which a transmission beam is formed appropriately based on a weight vector to be transmitted to a specific mobile station in a mobile communication system. For this purpose, a base station device has a reverse processor for processing a reverse signal received through the antenna array, a forward fading information extraction unit for extracting forward fading information from the received reverse signal, a beam formation controller for generating a weight vector for formation of a transmission beam using the forward fading information and the received reverse signal, and a forward processor having a transmission beam generator for generating a transmission beam for a transmission message based on the weight vector. A mobile station device has a forward processor for processing a received forward signal, a forward fading estimator for estimating forward fading information of the forward signal for each path, a forwarding fading encoder for combining the estimated forward fading information and encoding the combined forward fading information, and a reverse processor for multiplexing the encoded forward fading information with a transmission message and feeding back the forward fading information in the multiplexed signal to a base station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
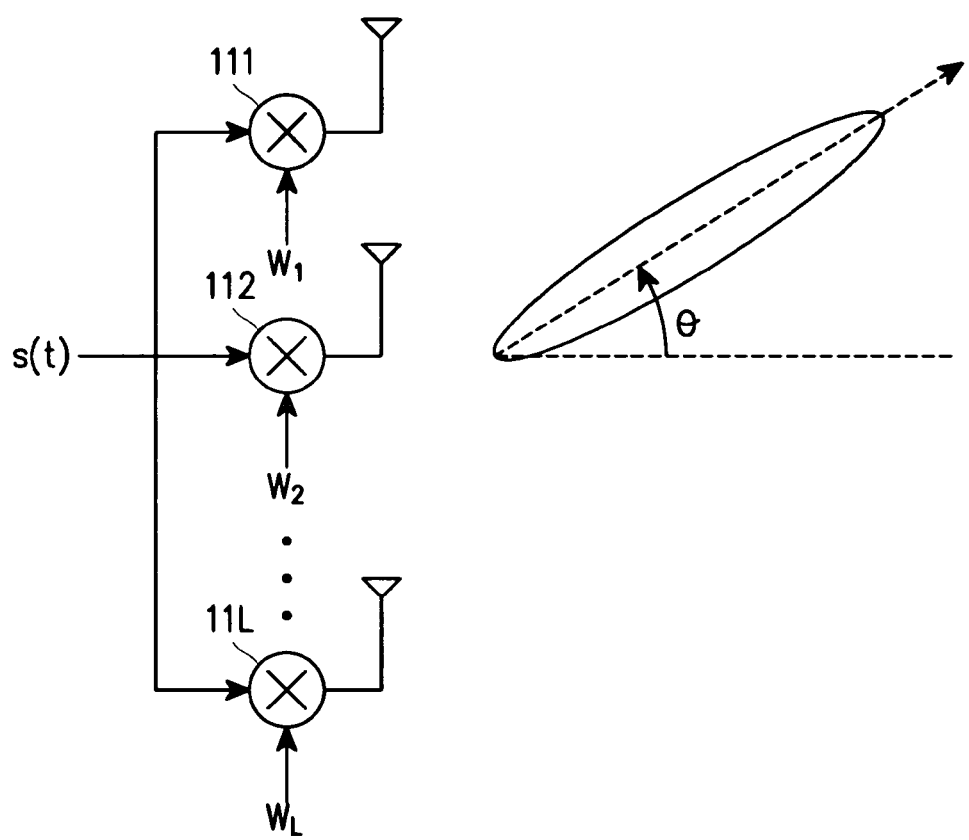
FIG. 1 illustrates transmission beam formation in a general transmit antenna array.
Figure 2:
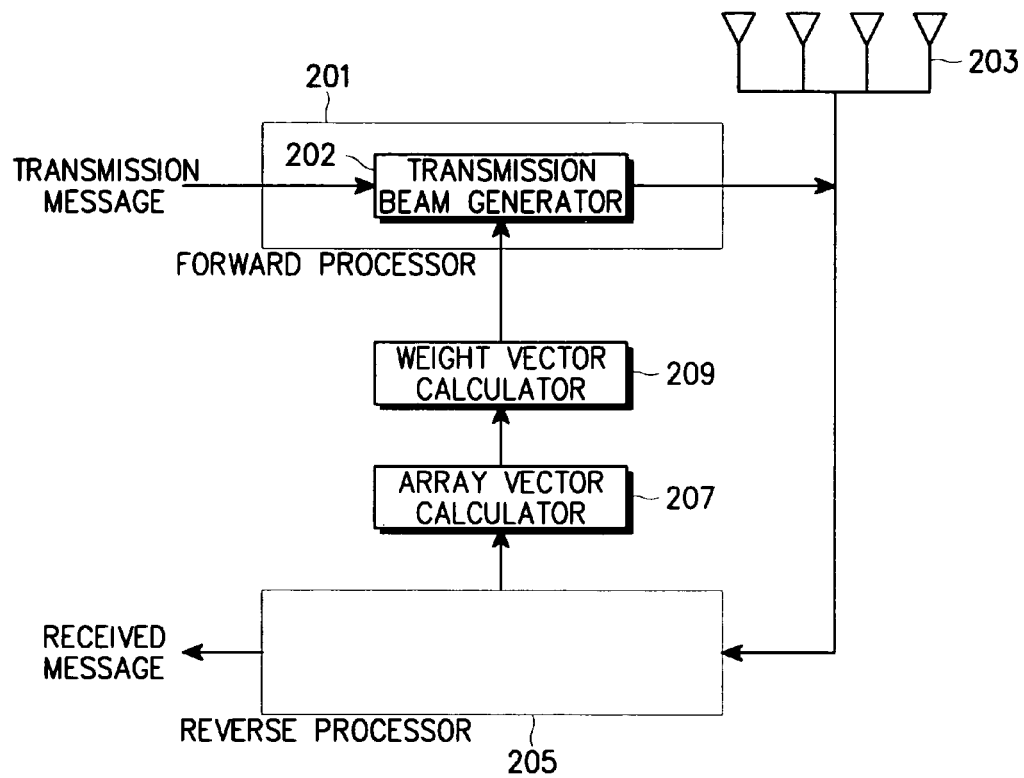
FIG. 2 is a block diagram of a conventional transmit antenna array system suggested by Raleigh.
Figure 3:
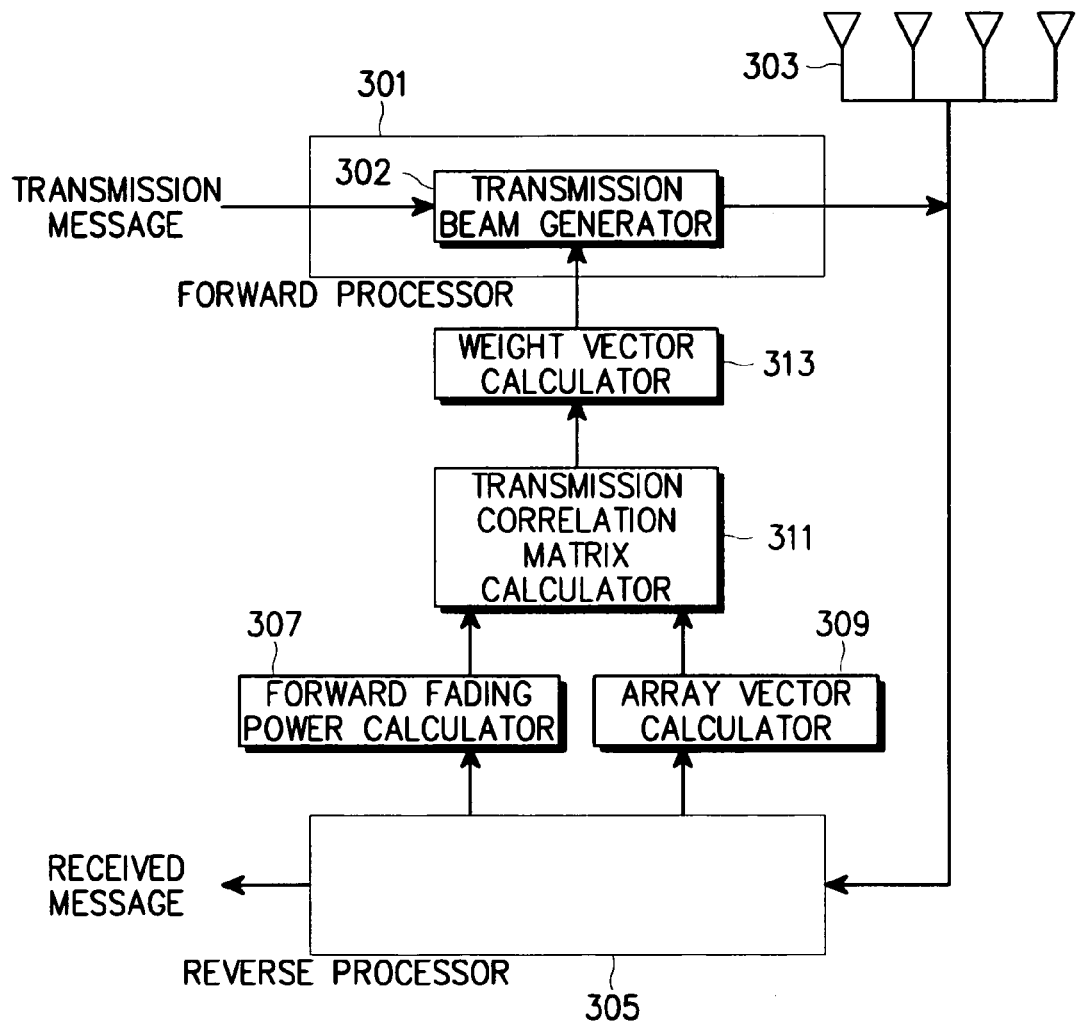
FIG. 3 is a block diagram of a conventional transmit antenna array system suggested by Thompson.

Preferred embodiments of the present invention will be described hereinbelow with reference to the accompanying drawings. In the following description, well-known functions or constructions are not described in detail since they would obscure the invention in unnecessary detail.

The present invention uses an instant forward fading coefficient instead of an average reverse fading coefficient in order to form a forward beam with improved performance as compared to the conventional antenna arrays systems. A base station, being a transmitting side, does not know the forward fading coefficient indicating channel characteristics in advance. Thus, according to the preferred embodiment of the present invention, a mobile station extracts the forward fading coefficient from the forward channel information and feeds it back on a reverse channel to the antenna array system. Herein, the reverse channel for transmitting forward channel information may be an existing reverse channel or a separately designated reverse channel. If an existing reverse channel transmits the forward fading coefficient, it may be a control channel. Then, a control channel message can be re-formatted to include the forward channel information.

While the conventional antenna array systems using an average reverse fading coefficient rely on blind beam formation, an antenna array system according to the present invention is a semi-blind beam formation scheme in that a base station receives feedback information about a forward fading coefficient from a mobile station.

The transmit antenna array system of the present invention relying on semi-blind beam formation will be described below.

Assuming that a fading channel is propagated in M different paths between a base station and a specific mobile station, and the base station transmits a transmission message s(t) to the mobile station using a transmit antenna array including L antennas, a signal r(t) received at the mobile station is $$r(t) = \sum_{i=1}^{M} \underline{h}_i^T \underline{w} s(t - \tau_i) + n(t) \quad (9)$$

where $\underline{w}$ is a weight vector assigned to the transmit antenna array, n(t) is AGWN, $\tau_i$ is a propagation delay for an ith path, and $\underline{h}_i$ is a channel vector for the ith path, given by $$\underline{h}_i = \beta_i \underline{a}(\theta_i) \quad (10).$$

As noted from Eq. 10, the channel vector $\underline{h}_i$ is a function of a fading coefficient $\beta_i$, a transmission direction $\theta_i$, and an array vector $\underline{a}(\theta_i)$ for the ith path.

The signal r(t) received at the mobile station on a forward channel can be divided into path components by a path divider and a collection of the path components $\underline{r}$ is expressed as $$\underline{r} = \begin{bmatrix} \underline{h}_1^T \underline{w} s(t - \tau_1) \\ \underline{h}_2^T \underline{w} s(t - \tau_2) \\ \vdots \\ \underline{h}_M^T \underline{w} s(t - \tau_M) \end{bmatrix} + \begin{bmatrix} n_1 \\ n_2 \\ \vdots \\ n_M \end{bmatrix} \quad (11)$$

$$= H \underline{w} \underline{s} + \underline{n}$$

In Eq. 11, $H=[\underline{h}_1, \underline{h}_2 \ldots \underline{h}M]^T$, $\underline{n}=[n_1, n_2 \ldots n_M]^T$, and $s(t-\tau_1)=s(t-\tau_2)=\Lambda=s(t-\tau_M)$. Here, $s(t-\rho_1)$, $s(t-\tau_2)$, ..., $s(t-\tau_M)$ are termed s. It is assumed that the length of a symbol in the received message is greater than any path delay.

Applying a matching filter theory to Eq. 11, a determination variable, a matching filter output is given by $$\hat{s} = (H\underline{w})^H \underline{r} \quad (12)$$

$$= \underline{w}^H H^H H \underline{w} \underline{s} + \underline{w}^H H^H \underline{n}$$

and an SNR for the determination variable is $$\gamma = \frac{w^H H^H H w}{\sigma_n^2} \quad (13)$$

where $\sigma_n^2$ is the power of the AGWN.

The optimal weight vector $\underline{w}$ maximizes the SNR of the matching filter output at a receiver on the assumption that the transmission power is P. From the foregoing, a transmission correlation matrix can be obtained by $$G = H^H H \quad (14)$$
$$= \sum_{i=1}^{M} |\beta_i|^2 \underline{a}(\theta_i)\underline{a}(\theta_i)^H.$$

Therefore, calculation of the optimal weight vector falls into calculation of a maximum eigen-vector corresponding to a maximum eigen-value of the above transmission correlation matrix in the end.

The transmission direction $\theta_i$, that is, the transmission array vector $\underline{a}(\theta_1)$ in Eq. 14 is known by estimating the reception direction of an input signal according to supposition 1 in the base station. However, information about the forward fading coefficient $\beta_i$, that is, the forward fading power $|\beta_i|^2$, cannot be obtained from the input signal but fed back from the mobile station on a revere channel.

In the present invention, the base station receives feedback information about a forward fading coefficient calculated by the mobile station on a separately designated reverse channel. By the forward fading coefficient, the base station forms the transmission correlation matrix G of Eq. 14 and calculates the maximal unique vector of the transmission correlation matrix G, so that it calculates a weight vector for use in forming an intended forward beam.

To reduce the feedback constraint of the mobile station by half, the base station may receive information about fading severity or fading power in a real value instead of a fading coefficient in a complex value from the mobile station. While the present invention is described in context with formation of a transmission beam based on feedback information of a fading coefficient, the same effect can be achieved by receiving the fading severity or fading power.

The mobile station estimates an input signal component for each path through a path divider and a fading estimator as in Eq. 11. If noise components are excluded from Eq. 11 for convenience sake, $$\underline{h}_i^T \underline{w} = \beta_1 \underline{a}(\theta_i)^T \underline{w} \quad (15)$$

the fading estimator functions to estimate not the forward fading coefficient itself but the product of the forward fading coefficient, the array vector, and the weight vector as shown in Eq. 15. Although it is ideal that the mobile station transmits the forward fading coefficient only on a reverse fading channel, in reality, the base station receives information including the forward fading coefficient, the array vector, and weights. Hereinbelow, the information including the forward fading coefficient, the array vector, and the weights will be referred to as "fading information". The forward fading coefficient can be replaced by a forward fading severity. The following description is based on a calculation of a weight vector using a forward fading coefficient. Therefore, the fading estimator in the base station must extract only the forward fading coefficient $\beta_i$ from the feedback information received from the mobile station.

The forward fading coefficient is extracted by two methods. One is to use an ominidirectional beam with $\underline{a}(\theta_i)^T \underline{w}$ independent of $\theta_i$ as a transmission beam so that an estimated value of the fading estimator becomes a function of the forward fading coefficient $\beta_i$ only. The mobile station may feed back this value on a separately designated reverse channel. The other method is to extract the forward fading coefficient $\beta_i$ using a known weight vector $\underline{w}$ used in transmitting a forward signal to the mobile station and $\theta_i$ estimable from a received signal by simple arithmetic operation in the base station, upon receipt of feedback information of an estimated input signal component for each path, $\{\beta_i \underline{a}(\theta_i)^T \underline{w}\}$ on a specific reverse channel from the mobile station.

A time delay may be involved in feeding back the forward fading coefficient $\beta_i$. If a time delay as long as a unit time D, for example a slot, exists between the mobile station and the base station, inevitably, a current forward fading coefficient must be estimated from previously fed back forward fading coefficients. This problem can be overcome by linear prediction.

Now a description of the linear prediction for estimating a forward feedback coefficient received with a time delay will be given.

Suppose $\beta_i[k]$ is a forward fading coefficient for an ith path at a kth time point (the present time point). By a linear combination of V fading coefficients, $\beta_i[k-D]$, $\beta_i[k-D-1]$, ... $\beta_i[k-D-V+1]$, $\beta_i[k]$ is estimated to $$\hat{\beta}_i[k] = \sum_{v=0}^{V-1} b_v \beta_i[k - D - v] \quad (16)$$

where if a definition is given as $\underline{b}=[b_0, b_1 \Lambda b_{v-1}]^T$ and $\underline{\beta}=[\beta_i[k-D]\beta_i[k-D-1]\Lambda\beta_i[k-D-V+1]]^T$, the equation 16 is $\hat{\beta}_k(k)=b^T\beta$ To obtain a coefficient vector $\beta$, a value $\beta$ which allows $E(\beta(k)-\Lambda\beta)^2$ to be a minimum value, should be calculated. Thus, the coefficient vector $\underline{b}$ is $$\underline{b} = R^{-1}\underline{p} \quad (17)$$

according to the linear prediction method.

In Eq. 17, $R=E[\underline{\beta}\underline{\beta}^H]$ and $\underline{p}=[\beta_i[k]\underline{\beta}^*]$. A correlation coefficient between delayed fading coefficients, needed to calculate Eq. 17 is calculated by $$E[\beta_i[k]\beta_1^*[k-u]] = \sigma_\beta^2 J_0(2\pi f_D T u) \quad (18)$$

where $\beta_i[k]$ is a Fading Coefficient received at a kth time point on a ith path, $\sigma_\beta^2=E[|\beta_1|^2]$, $f_D$ is a Doppler frequency, $J_0(\cdot)$ is a Bessel function of the first kind of order zero, and T is the length of a unit time.

If the base station receives feedback only information of a fading severity being a real value instead of a fading coefficient being a complex value from the mobile station, it is advantageous to reduce the number of bit sent to a reverse channel. If $|\beta_i[k]|$ is a forward fading severity for an ith path at a kth time point (the present time point), it is estimated by a linear combination of V fading severities fed back from the mobile station before the unit time D, $|\beta_1[k-D]|$, $|\beta_i[k-D-1]|$, ..., $|\beta_1[k-D-V+1]|$. Thus, an average of the forward fading coefficient is 0 but average of the fading severity for obtaining an absolute value is not 0. In view of the foregoing, the above step using a fading coefficient being a complex value cannot be applied without modification.

However, the above procedure is not applicable because the average of the forward fading seventies is not zero. A zero-average forward fading seventy, can be defined as $$\delta_i = |\beta_i| - E[|\beta_i|] \quad (19)$$

and $|\beta_i[k]|$ is estimated by a linear combination of $\delta_i[k-D]$, $\delta_i[k-D-1], \ldots, \delta_i[k-D-V+1]$ as $$|\hat{\beta}_i[k]| = \sum_{v=0}^{V-1} d_v \delta_i[k-D-v] + E[|\beta_i|] \quad (20)$$

where if $\underline{d} = [d_0 d_1 \Lambda d_{v-1}]^T$ and $\delta = [\delta_i[k-D][\delta_i[k-D-1]\Lambda[\delta_{i[k-D-V+}1]^T$, the coefficient vector $\underline{d}$ is calculated by $$\underline{d} = R^{-1} \underline{p} \quad (21)$$

according to the linear prediction method.

In Eq. 21, $R = E[\underline{\delta}\underline{\delta}^T]$ and $\underline{p} = E[\delta_1[]\underline{\delta}]$. A correlation coefficient between delayed zero-average fading coefficients, needed to calculate Eq. 21 is calculated by $$E[\delta_i[k]\delta_i[k-u]] = \sigma_\delta^2 J_0^2(2\pi f_D Tu) \quad (22)$$

where $\sigma_\delta^2 = E[|\delta_1|^2]$, $f_D$ is a Doppler frequency, $J_0(\cdot)$ is a Bessel function of the first kind of order zero, and T is the length of a unit time. $E[\beta_1]$ is obtained by time-averaging forward fading severity sample values for each path.

As the mobile station travels at a higher speed, the Doppler frequency increases and channel characteristics are quickly changed. As a result, the reliability of the present forward fading coefficient estimated by the linear prediction is decreased and the whole system performance is deteriorated. In this case, the whole system performance may improve by using an average reverse channel fading coefficient based on blind transmission rather than the current forward fading coefficient based on linear prediction. That is, first, a Doppler frequency threshold is set to a predetermined value. Then, when the measured Doppler frequency is below the threshold, which means low mobile speed, the linear prediction method is selected since the linear prediction is_regarded as reliable. Otherwise, the blind transmission method is selected instead of the linear prediction method since the linear prediction is regarded as unreliable for high mobile speed. The selective use of the linear prediction method and the blind transmission method is called a mixed method.

Formation of a transmission beam can be implemented in four embodiments according to time delay and channel changes. The four embodiments of the present invention are termed a basic type, a prediction type, a basic mixed type, and a prediction mixed type, respectively. Commonly in the four embodiments, a mobile station feeds back forward fading information to a base station and the base station generates a weight vector based on the forward fading feedback information to efficiently form a transmission beam. The four embodiments are very similar in structure and operation but they differ in the essence of a transmission beam formation algorithm, the configuration of a transmission correlation matrix.

Figure 4:
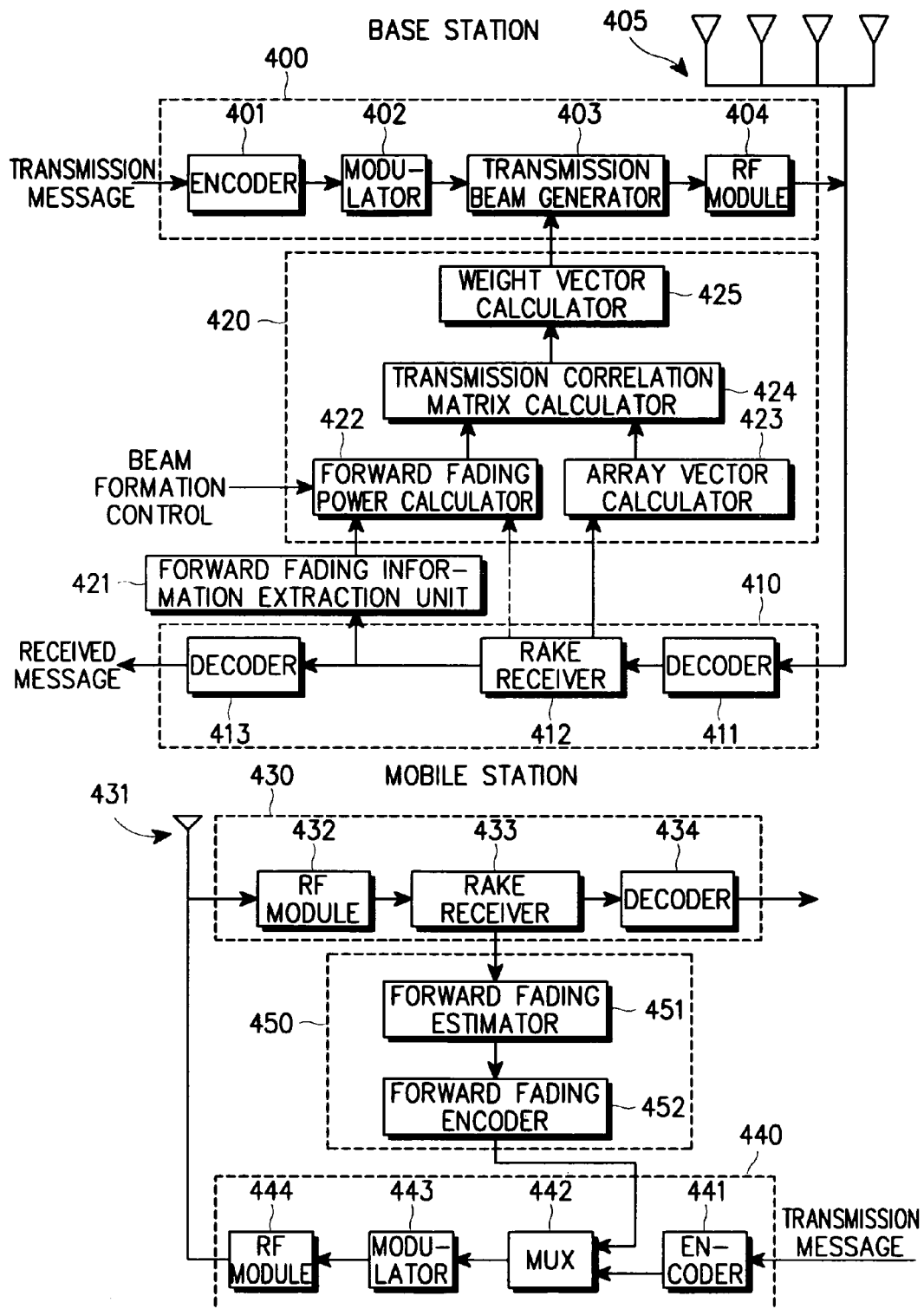
FIG. 4 is a block diagram of a transmit antenna array system in a mobile communication system according to the present invention.
Figure 9:
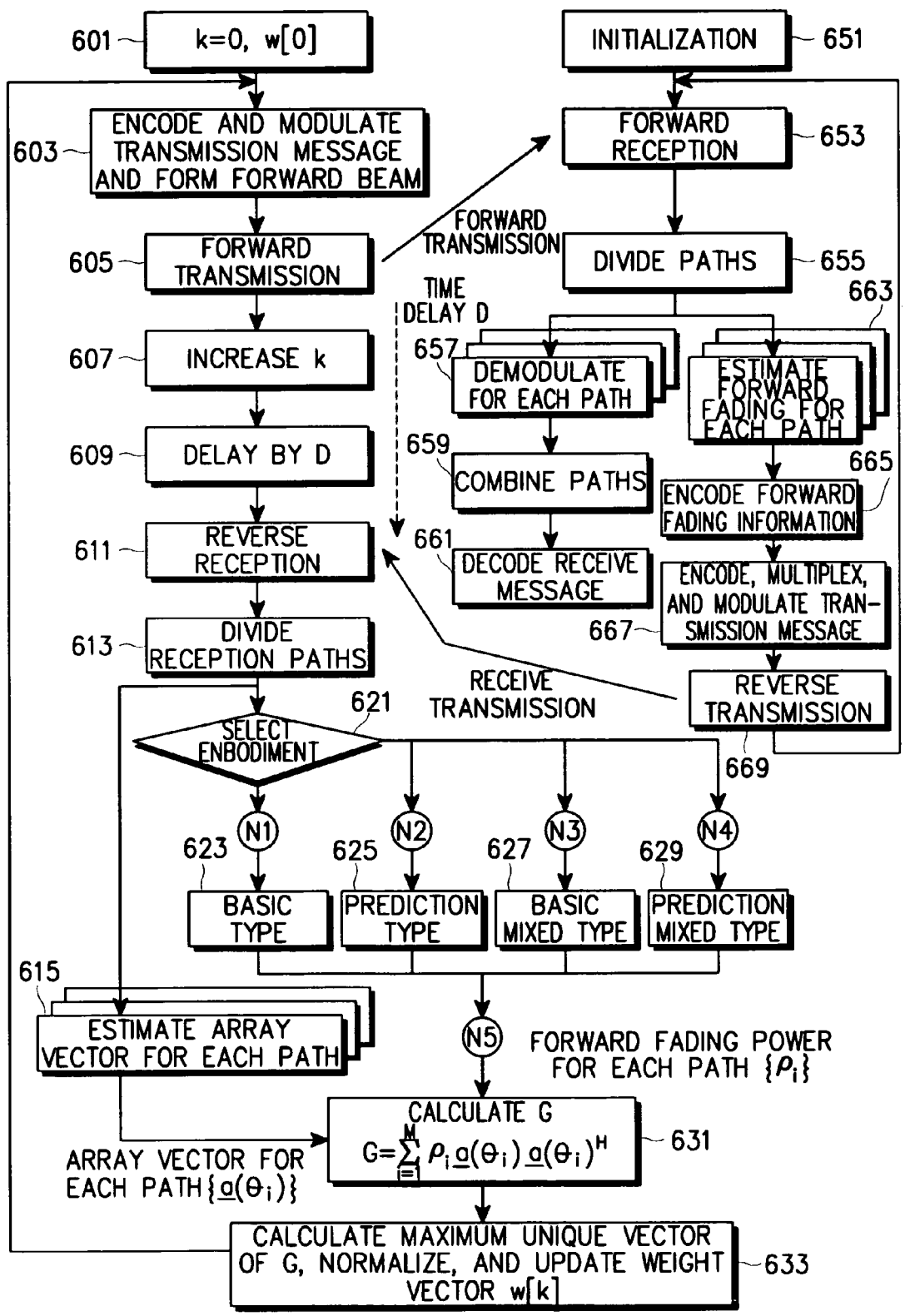
FIG. 9 is a flowchart illustrating the whole operation of the transmit antenna array system according to the present invention.

FIG. 4 is a block diagram of a transmit antenna array system for a base station in a mobile communication system according to the present invention. A mobile station is also shown in the drawing. The transmit antenna array system receives a forward fading coefficient from the mobile station and calculates an optimal weight vector based on the forward fading coefficient to efficiently form a transmission beam. The mobile station, after receiving a forward signal from the base station, estimates the forward fading coefficient and transmits it to the base station on a predetermined reverse channel. A forward fading severity can be used instead of the forward fading coefficient. FIG. 9 is a flowchart illustrating an operation between the base station and the mobile station shown in FIG. 4.

Referring to FIG. 4, the base station is comprised of a forward processor 400, an antenna array 405, a reverse processor 410, a forward fading information extraction unit 421, and a beam formation controller 420.

The forward processor 400 subjects a transmission signal to encoding and modulation, and upconverts the frequency of the modulated signal to an RF signal. A transmission beam generator 403 forms a beam for the forward transmission signal. The forward processor 400 includes an encoder 401, a modulator 402, the transmission beam generator 403, and an RF module 404.

The antenna array 405 includes L antennas and propagates a beam in a direction determined by the transmission beam generator 403 of the forward processor 400.

The reverse processor 410 subjects an RF signal received via the antenna array 405 to downconversion, demodulation, and decoding. The reverse processor 410 includes an RF module 411, a rake receiver 412 with M fingers, a path divider, and a path combiner, and a decoder 413.

The forward fading information extraction unit 421 functions to extract a forward fading coefficient from the fading information of a signal received from the rake receiver 412 of the reverse processor 410. Here, a forward fading severity may be included in the fading information instead of the forward fading coefficient.

The beam generation controller 420 receives the forward fading coefficient from the forward fading information extraction unit 421, and array vector, a reverse fading information and a Doppler frequency information output from the rake receiver 412 and generates a weight vector to control formation of the transmission beam. The beam formation controller 420 has a forward fading power calculator 422, an array vector calculator 423, a transmission correlation matrix calculator 424, and a weight vector calculator 425. As many forward fading power calculators 422 and array vector calculators 423 as signal paths must be provided. Therefore, it is desirable to configure the forward fading power calculator 422 and the array vector calculators 423 corresponding to the respective fingers of the rake receiver 412. The beam formation controller 420 varies in the four embodiments of the present invention.

A reception beam generator (not shown) is disposed before or after a demodulator in each finger of the rake receiver 412. The modulator 402 may be exchanged with the transmission beam generator 403 in position within the forward processor 400. Since the embodiments of the present invention are implemented on the same principle, the present invention should be considered to incorporate the above possibilities therein.

The transmit antenna array system of the base station controls formation of a transmission beam according to forward fading information fed back from the mobile station. To allow for this operation, the mobile station receives a forward link signal from the base station, estimates the forward fading information, and feeds back the estimated fading information the base station, which will be described referring to FIG. 4.

An antenna array system is not commonplace in mobile stations. Therefore, the mobile station shown in FIG. 4 uses a single antenna 431.

A forward processor 430 in the mobile station processes a signal received from the base station on a forward link. The forward processor 430 includes an RF module 432, a rake receiver 433 with M fingers, a path divider, and a path combiner, and a decoder 434.

A reverse processor 440 subjects a transmission signal to encoding and modulation, and transmits a modulated signal to the base station on a reverse channel. The reverse processor 440 includes an encoder 441, a multiplexer 442, a modulator 443, and an RF module 444.

A forward processor 450 estimates forward fading information from the received forward link signal, encodes the estimated forward fading information, and feeds back the encoded forward fading information on a particular reverse channel. The forward processor 450 includes a forward fading estimator 451 and a forward fading encoder 452. Here, "fading information" estimated by the forward fading estimator 451 refers to information containing a weight vector and an array vector for beam formation as well as a fading coefficient for a multi-path fading channel. As shown in Eq. 15, the fading information contains the forward fading coefficient $\beta_i$, the array vector $\underline{a}(\theta_i)$, and the weight $\underline{w}$. This is the difference between the fading information of the present invention and fading information conventionally used in the case when a smart antenna is not employed.

The forward processors 400 and 430 and the reverse processors 410 and 440, except for the transmission beam generator 403, are the same in structure as the counterparts used in a general CDMA communication system.

Upon receipt of a transmission message through the encoder 401 and the modulator 402 in the base station, the transmission beam generator 403 forms a transmission beam with use of an appropriate initial weight vector $\underline{w}[0]$ received from the weight vector calculator 425. The transmission beam is radiated into the air via the RF module 404 and the antenna array 405.

The mobile station receives the forward signal via the single antenna 431 and the RF module 432, divides, demodulates, and combines the forward signal according to the paths in the rake receiver 433, and recovers a received message in the decoder 434.

The forward signal received at the mobile station is given as Eq. 9. The channel vector $\underline{h}_1$, for each path in Eq. 9 includes information about a forward fading coefficient and an array vector as shown in Eq. 10. Therefore, forward fading information estimated by the forward fading estimator 451 includes a forward fading coefficient, an array vector, and a weight as shown in Eq. 15. Since what the base station needs is $\beta_i$, the forward fading estimator 451 may extract only the forward fading coefficient from the fading information and transmits it. Or the forward fading estimator 451 may estimate a forward fading severity being a real value instead of the forward fading coefficient being a complex value. The forward fading coefficient facilitates linear prediction, whereas feedback of the estimated forward fading coefficient to the base station is a constraint to the mobile station. On the other hand, despite the advantage of a relatively small feedback constraint, the forward fading severity makes the linear prediction quite complicated. Accordingly, the forward fading coefficient or the forward fading severity can be selected adaptively to the situation.

The forward fading encoder 452 encodes the estimated forward fading information and feeds the encoded signal to the multiplexer 442. The encoded forward fading information may be transmitted on a reverse link channel separately designated or it may be inserted into a modified control channel frame and transmitted on an existing control channel.

In operation, the forward fading estimator 451 in the mobile station estimates a fading coefficient for each path from a forward signal received from the rake receiver 433. The forward fading encoder 452 collects all forward fading information and encodes the forward fading information. The multiplexer 442 multiplexes the encoded forward fading information with an encoded transmission message and the resulting signal is radiated into the air via the modulator 443, the RF module 444, and the single antenna 431.

Though the mobile station returns to a reception mode, transmission and reception are virtually concurrent in the mobile station and the above procedure is repeated. It is assumed here that a delay of a unit time D (usually a slot) is involved between forward transmission and reverse transmission.

The base station receives the reverse signal via the antenna array 405 and the RF module 411 and subjects the received reverse signal to demodulation and decoding through the rake receiver 412 and the decoder 413. During this operation, a reverse beam generator in the rake receiver 412 generates a reverse beam, which will not be described here.

The beam formation controller 420 of the base station calculates weight vectors for formation of a next transmission beam. The following procedure is common to the first and fourth embodiments of the present invention.

The forward fading information extraction unit 421 extracts forward fading feedback information from the intermediate output of the rake receiver 412. The forward power calculator 422 calculates a forward fading power $\{p_i\}$ for each path, which is really applied to a transmission antenna array, based on the extracted forward fading information and reverse fading information for each path and Doppler frequency information obtained during processing the reverse signal in the rake receiver 412. Simultaneously, the array vector calculator 423 calculates an array vector $\{\underline{a}(\theta_i)\}$ for each path based on information about reception directions obtained during the reverse signal processing in the rake receiver 412.

The transmission correlation matrix calculator 424 calculates a transmission correlation matrix $$G = \sum_{i=1}^{M} p_i \underline{a}(\theta_i) \underline{a}(\theta_i)^H$$

using the forward fading powers $\{p_i\}$ and the array vectors $\{\underline{a}(\theta_i)\}$. The weight vector calculator 425 calculates a maximum unique vector of the transmission correlation matrix, normalizes it, and sets the normalized maximum unique vector as a weight vector $\underline{w}k$ to the transmission beam generator 403 for the next transmission.

The forward processor 400 encodes and modulates a transmission message through the encoder 401 and the modulator 402. The transmission beam generator 403 forms a transmission beam according to the weight vector received from the weight vector calculator 425 to transmit the modulated transmission message. The transmission beam is upconverted in the RF module 404 and radiates into the air via the antenna array 405.

Though the base station returns to a reception mode, transmission and reception are concurrent in the base station and the above operation repeats.

FIG. 9 is a flowchart illustrating the operations of the base station and the mobile station shown in FIG. 4. Referring to FIG. 9, the base station sets a time point and a weight vector to initial values (k=0 and w[0]) in step 601 and the mobile station is also initialized in step 651.

In steps 603 and 605, the base station encodes and modulates a transmission message through the forward processor 400, forms a transmission beam based on the weight vector, and transmits the transmission beam on a forward link. In steps 607 to 611, the base station increases the time point k and waits for the unit time D until it receives a receiver signal. While awaiting receipt of the reverse signal, the base station performs other operations.

Upon receipt of the forward signal in step 653, the mobile station separates the paths from which the forward signal arrives through the forward processor 430. In steps 657 to 661, the mobile station demodulates the forward signal for each path and combines the demodulated signals through the forward processor 430 and decodes the combined signal, thereby recovering a received message. In steps 663 to 669, the mobile station estimates forward fading information for each path, encodes the estimated forward fading information, and transmits the encoded forward fading information on a reverse channel through the reverse processor 440. Then, the mobile station returns to step 653 to await receipt of a next forward signal.

Upon receipt of the reverse signal in step 611, the base station separates the paths from which the reverse signal arrives through the reverse processor 410 in step 613. In step 621, the base station controls the forward fading power calculator 422 to select one of the four embodiments for generation of a weight vector. The base station controls the array vector calculator 423 to estimate an array vector $\{\underline{a}(\theta_1)\}$ for each path in step 615.

Selection of the embodiments of the present invention depends on the length of the feedback delay time D and the movement speed of the mobile station. If the feedback delay time D is relatively short and the mobile station travels at a low speed, a forward fading power is calculated by choosing the first embodiment of the present invention, a basic type in step 623.

If the feedback delay time D is long and the mobile station travels at a low speed, the forward fading power is calculated by choosing the second embodiment of the present invention, a prediction type 625.

If the movement speed of the mobile station exceeds a threshold, use of the basic type or the prediction type may deteriorate performance drastically. In this case, a blind forward beam formation method can be a desirable candidate. Therefore, the third embodiment (a basic mixed type) or the fourth embodiment (a prediction mixed type) can be selectively used according to the movement speed of the mobile station. In the basic mixed type, a choice made between the basic type and the blind forward beam formation method, and in the prediction mixed type, a choice is made between the prediction type and the blind forward beam formation method. In step 627, the forward fading power is calculated in a selected type according to the third embodiment of the present invention and, in step 629 it is calculated in a selected type according to the fourth embodiment of the present invention.

A detailed description of the operation of calculating the forward fading power $p_i$ for each path according to the first to fourth embodiments of the present invention will be given below After the array vector and forward fading power for each path are calculated, a transmission correlation matrix G is calculated in step 631. In step 633, a maximum unique vector of the transmission correlation matrix G is calculated and normalized, thereby updating the weight vector for use in forming a transmission beam that transmits a next transmission message.

The mobile station estimates the forward fading information and feeds back it to the base station. Then, the base station generates a weight vector by estimating the forward fading information, a reverse fading power, and a Doppler frequency received on a reverse link and forms a transmission beam based on the weight vector. For formation of the transmission beam, the forward fading power calculator 422 operates according to one of the four embodiments according to the feedback delay time D and the movement speed of the mobile station.

First Embodiment (Basic Type)

Figure 5:
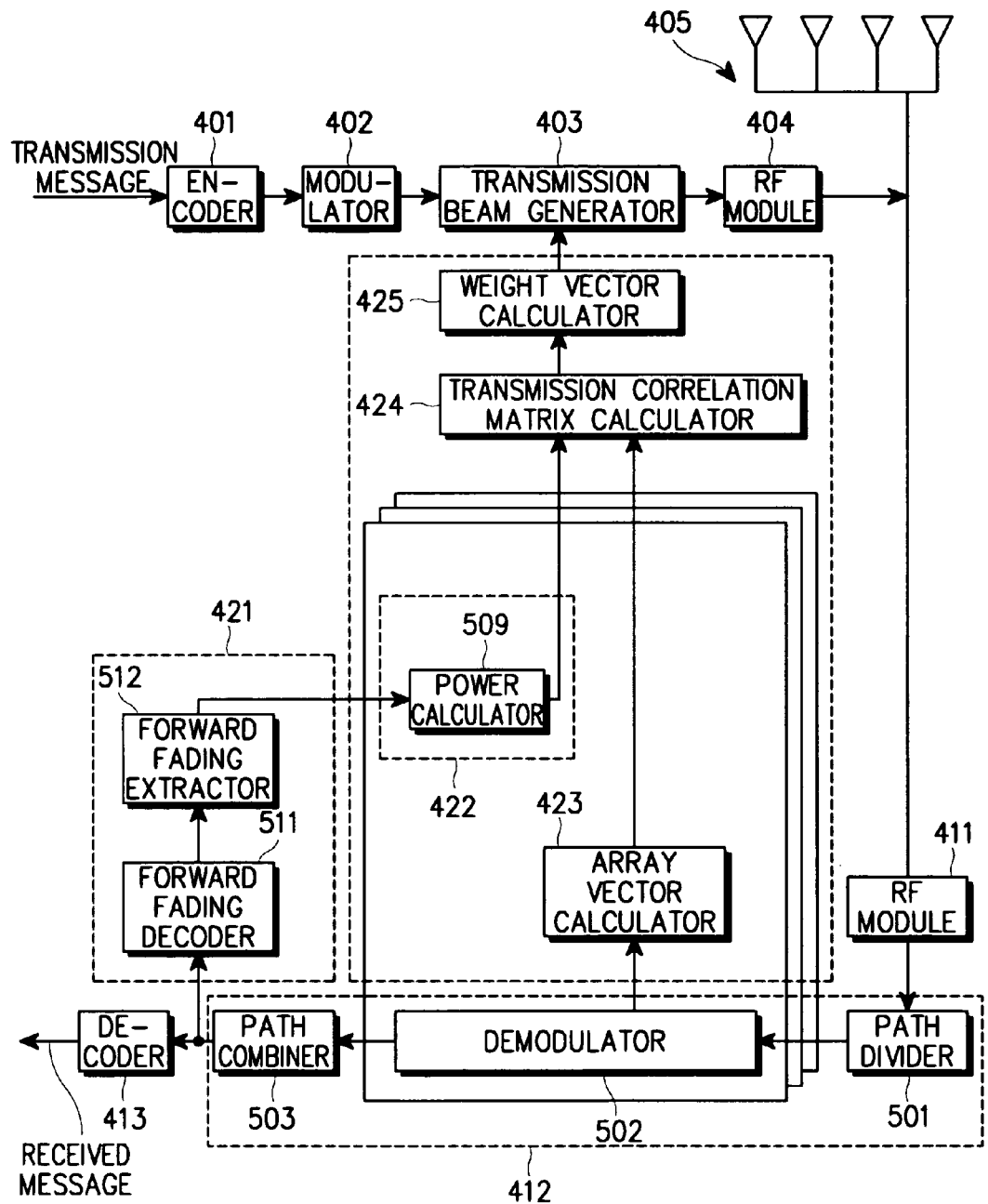
FIG. 5 is a block diagram of an embodiment of the transmit antenna array system (a basic type) according to the present invention.

A transmit antenna array system according to the first embodiment of the present invention is used when the feedback delay time D is 0 or relatively short and the mobile station travels at a low speed. This transmit antenna array system is referred to as a basic type. FIG. 5 is a block diagram of the transmit antenna array system according to the first embodiment and FIG. 10 is a flowchart illustrating a forward fading power calculating operation according to the first embodiment.

Figure 10:
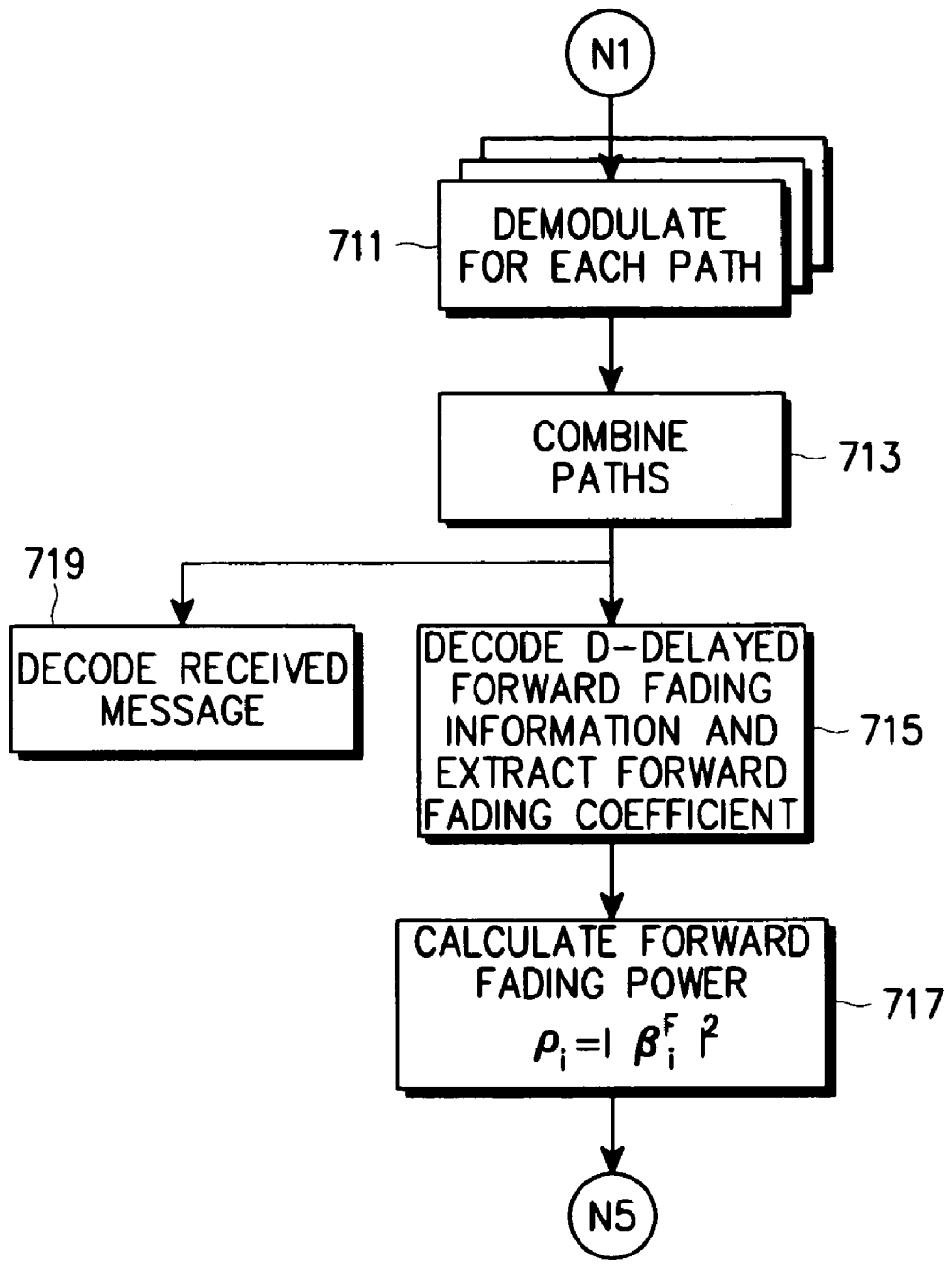
FIG. 10 is a flowchart illustrating a forward fading power calculation procedure in the first embodiment of the transmit antenna array system according to the present invention.

Referring to FIGS. 5 and 10, the path divider 501 of the rake receiver 412 separates a reverse signal for each path, the demodulator 502 in each finger demodulates the reverse signal for each path, and the path combiner 503 combines all finger outputs appropriately in steps 711 and 713. In step 719, the decoder 413 decodes the combined signal, thereby recovering a received message.

Meanwhile, a forward fading decoder 511 obtains forward fading information that was received from the mobile station with a delay of the unit time D, $\{\beta_i^F[k-D]\underline{a}(\theta_1)^H\underline{w}\}$ or $\{|\beta_1^F[k-D]\underline{a}(\theta_i)^H\underline{w}|\}$ and a forward fading extractor 512 extracts a forward fading coefficient $\beta_i[k-D]$ or $|\beta_i[k-D]|$ from the forward fading information in step 715. Here, $\{\underline{a}(\theta_i)^H\underline{w}\}$ is a value that the base station can know in advance. F represents forward, k is the current time point, and i is a path index (i=1, . . . , M). In step 717, the base station regards the forward fading coefficient $\beta_1[k-D]$ or $|\beta_1[k-D]|$ as received at the current time point despite the time delay of D and each power calculator 509 calculates forward fading power $\{p_i\}=\{|\beta_1^F[k]|\}$ for each path.

Each array vector calculator 423 calculates an array vector from the reverse signal received from the demodulator 502. Then the transmission correlation matrix calculator 424 calculates a transmission correlation matrix G using the forward fading powers and the array vectors. The weight vector calculator 425 calculates a maximum unique vector from the transmission correlation matrix G, normalizes it, and sets the normalized maximum unique vector as a weight vector w[k] for transmission at the next time point.

Second Embodiment (Prediction Type)

Figure 6:
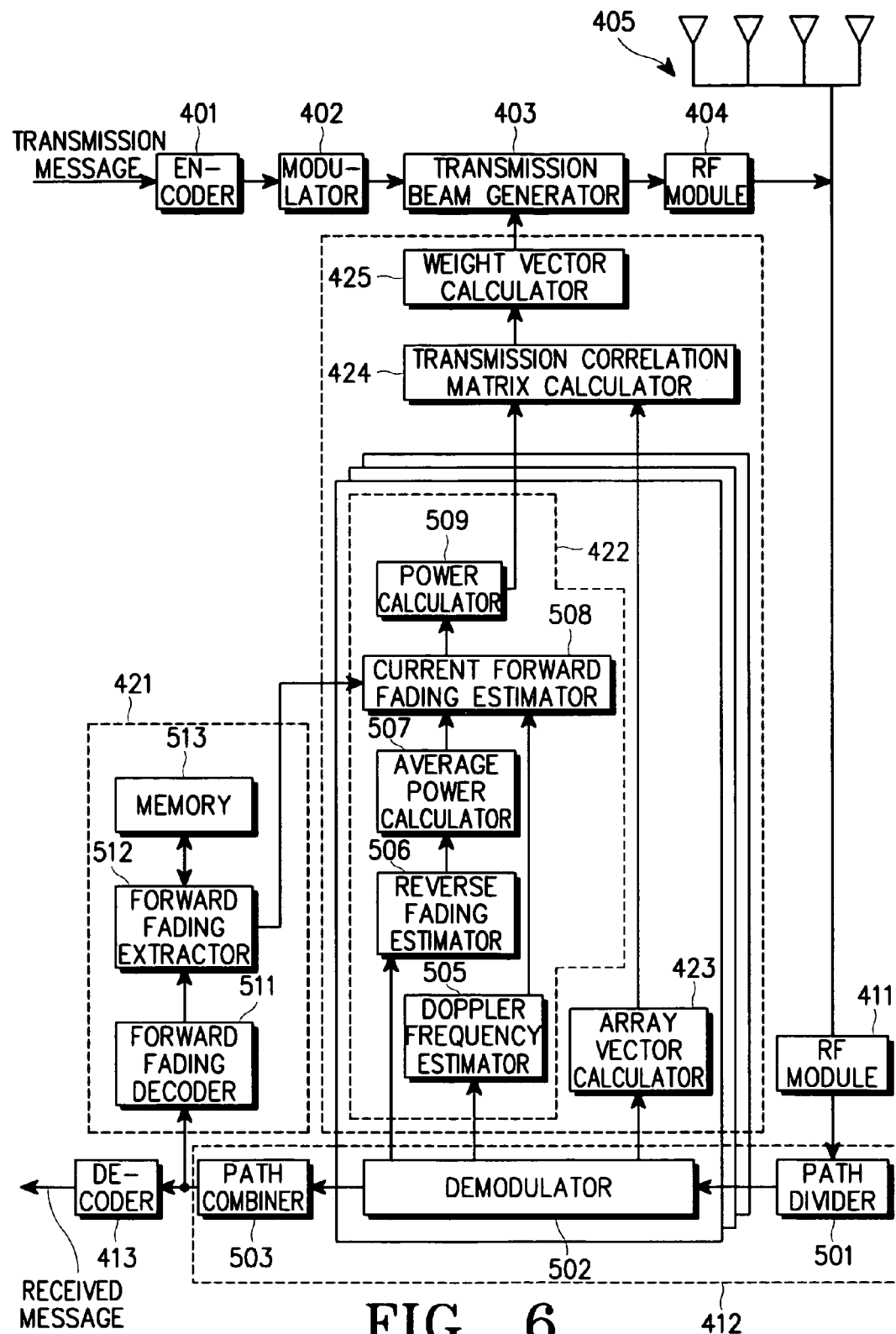
FIG. 6 is a block diagram of another embodiment of the transmit antenna array system (a prediction type) according to the present invention.
Figure 11:
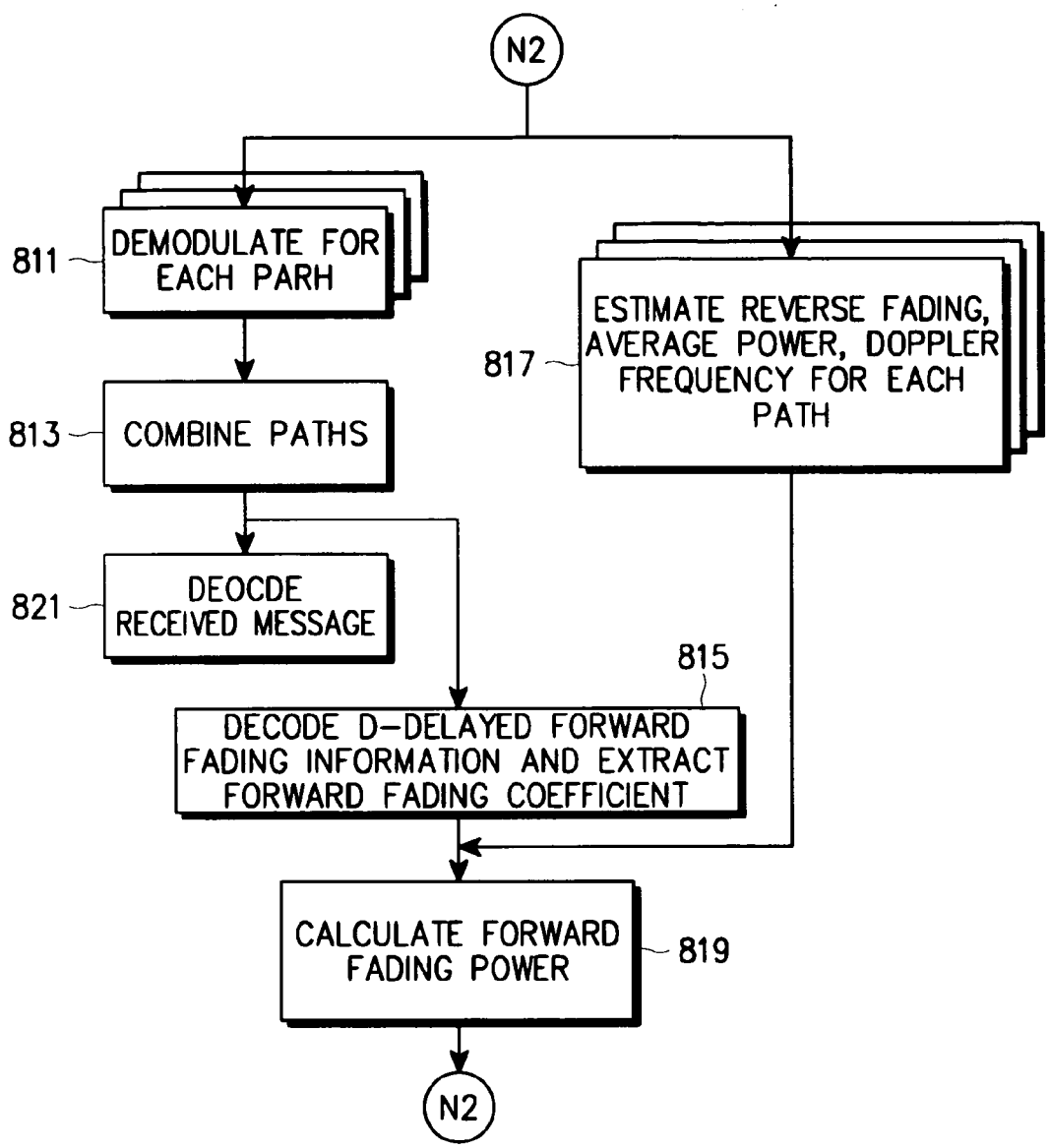
FIG. 11 is a flowchart illustrating a forward fading power calculation procedure in the second embodiment of the transmit antenna array system according to the present invention.

When the feedback delay time D is rather long, the prediction type can be used which has a means for predicting the current forward fading coefficient from previous feedback forward fading information. A transmit antenna array system according to the second embodiment of the present invention is shown in FIG. 6 and its operation is illustrated in FIG. 11. While any predictor may be used with the same effect for this transmit antenna array system, it is assumed that a linear predictor is provided.

Referring to FIGS. 6 and 11, the path divider 501 of the rake receiver 412 separates a reverse signal for each path, the demodulator 502 in each finger demodulates a corresponding reverse signal, and the path combiner 503 combines all finger outputs appropriately in steps 811 and 813. In step 821, the decoder 413 decodes the combined signal, thereby recovering a received message.

Meanwhile, the forward fading decoder 511 obtains forward fading information received from the mobile station with a delay of the unit time D, $\{\beta_1^F[k-D]\underline{a}(\theta_1)^H\underline{w}\}$ or $\{|\beta_1^F[k-D]\underline{a}(\theta_1)^H\underline{w}|\}$ and the forward fading extractor 512 extracts a forward fading coefficient $\beta_1[k-D]$ or $|\beta_i[k-D]|$ from the forward fading information in step 815. The extracted forward fading coefficient is stored in a memory 513.

The previous forward fading information is read from the memory 513. A group of V delayed forward fading coefficients $\{\beta_i^F[k-D], \beta_i^F[k-D-1], \Lambda, \beta_i^F[k-D-V+1]\}$ or $\{|\beta_i^F[k-D], \beta_i^F[k-D-1], \Lambda, \beta_i^F[k-D-V+1]|$ or are formed from the previous forward fading information.

In step 817, each reverse fading estimator 506 estimates a reverse fading coefficient $\{\beta_1^R\}$ for each path, each average power calculator 507 calculates an average power of the reverse fading coefficients $\{E|\beta_i^R|^2\}$ for each path, and each Doppler frequency estimator 505 estimates a Doppler frequency $\{f_{D,i}\}$ for each path.

In step 819, each current forward fading estimator 508 receives the forward fading coefficient, the average reverse fading power and the Doppler frequency obtained by reverse fading estimation for each path and estimates a current forward fading for each path, and each power calculator 509 calculates forward fading power for each path. The current forward fading estimator 508 forms the group of V delayed forward fading coefficients $\{\beta_i^F[k-D],\beta_i^F[k-D-1],\Lambda,\beta_i^F[k-D-V+1]\}$ or the group of V delayed forward fading severities $\{|\beta_i^F[k-D],\beta_i^F[k-D-1],\Lambda,\beta_i^F[k-D-V+1]|\}$ from the previous forward fading information read from the memory 513.

In the case of the forward fading coefficient group, the current forward fading estimator 508 estimates the current forward fading coefficient $\{|\beta_i^F[k]|\}$ using $\{\beta_i^F[k-D],\beta_{iF}[k-D-1],\Lambda,\beta_i^F[k-D-V+1]\}$, $\{E|\beta_i^R|^2\}$, and $\{f_{D,i}\}$ for a corresponding path by the linear prediction method shown in Eq. 16, Eq. 17, and Eq. 18. On the other hand, in the case of the forward fading seventy group, the current forward fading estimator 508 estimates the current forward fading severity $\{|\beta_i^F[k]|\}$ using $\{\beta_i^F[k-D],\beta_i^F[k-D-1],\Lambda,\beta_i^F[k-D-V+1]\}$, $\{E|\beta_i^R|^2\}$, and $\{f_{D,i}\}$ for a corresponding path by the linear prediction method shown in Eq. 20, Eq. 21, and Eq. 22.

The power calculator 509 calculates a forward fading power $\{p_1\}=\{|\beta_1^F|^2\}$ for the corresponding path based on the forward fading coefficient.

The array vector calculator 423 calculates an array vector from the reverse signal of the corresponding path received from the demodulator 502. Then the transmission correlation matrix calculator 424 calculates a transmission correlation matrix G using the forward fading powers and the array vectors. The weight vector calculator 425 calculates a maximum unique vector from the transmission correlation matrix G, normalizes it, and sets the normalized maximum unique vector as a weight vector w[k] for transmission at the next time point.

Third Embodiment (Basic Mixed Type)

When the feedback delay time D is 0 or relatively short, the first embodiment shows good performance until the movement speed of the mobile station reaches a threshold. However, once the mobile station travels at a speed over the threshold, the performance drastically decreases. To overcome this problem, the blind forward beam formation method can be used when it is determined that the mobile station travels at a speed over the threshold. In the third embodiment, the basic type and the blind forward beam formation method are selectively used according to the movement speed of the mobile station. This scheme is referred to as a basic mixed forward beam formation method.

Figure 7:
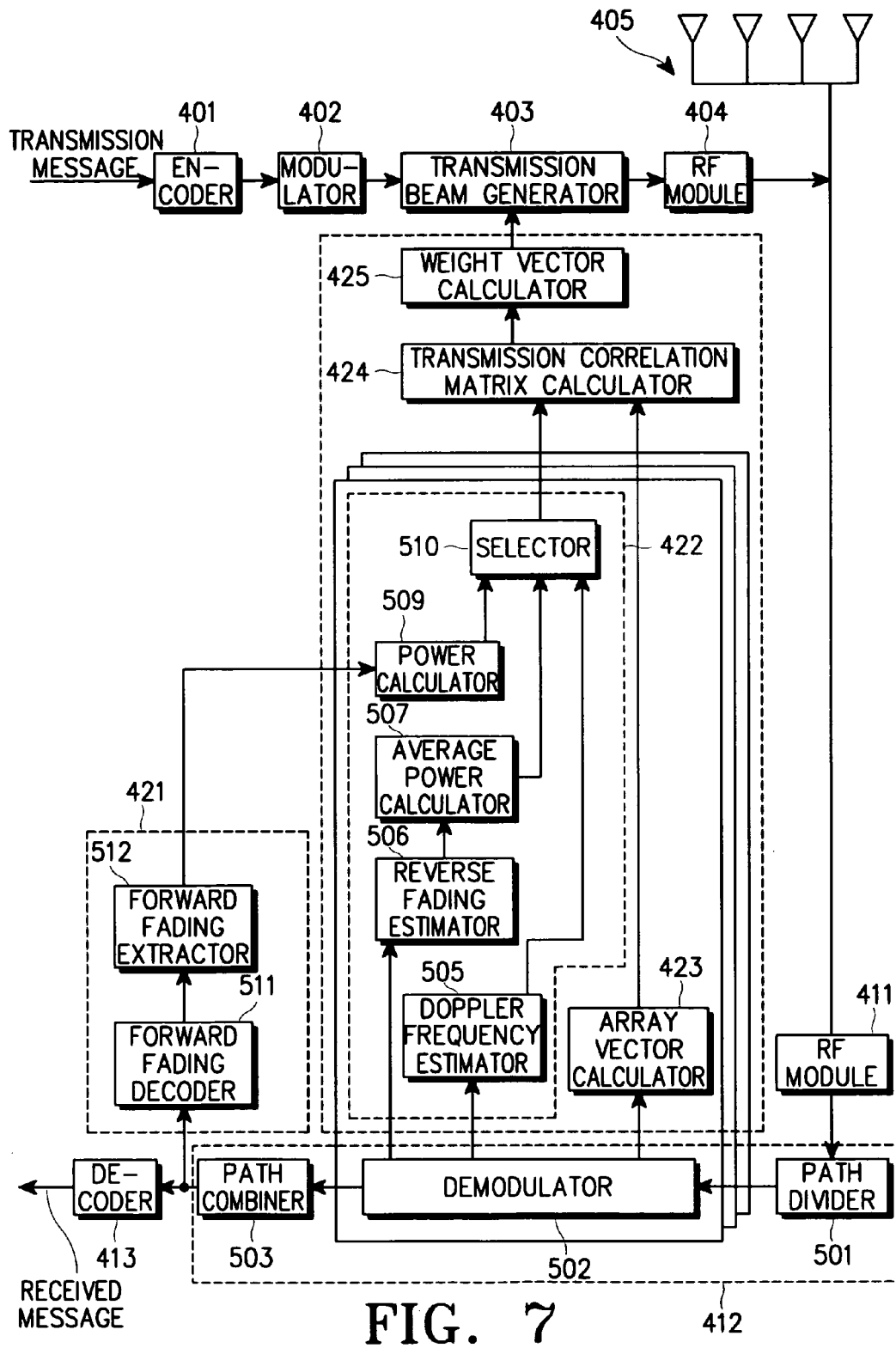
FIG. 7 is a block diagram of a third embodiment of the transmit antenna array system (a basic mixed type) according to the present invention.
Figure 12:
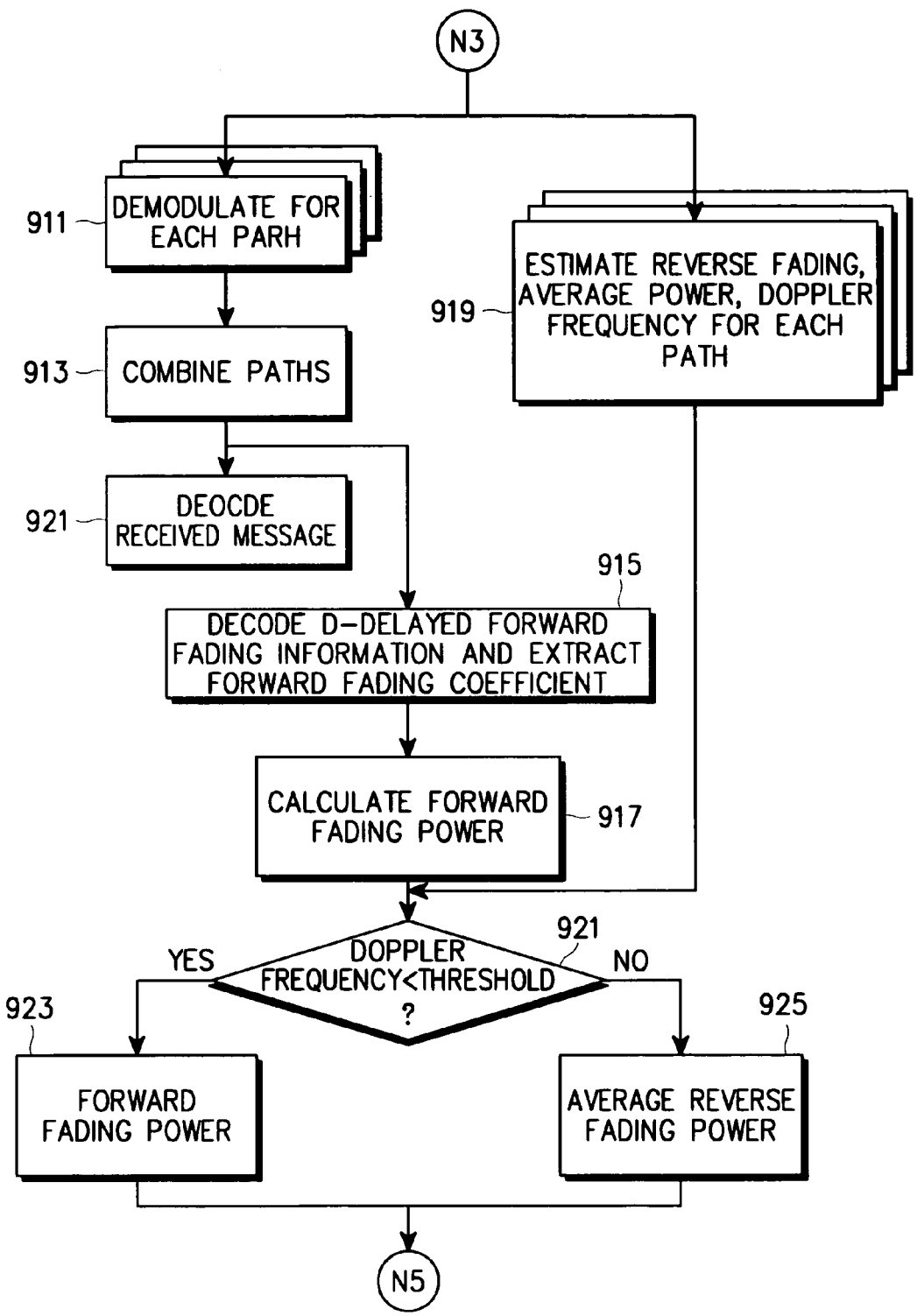
FIG. 12 is a flowchart illustrating a forward fading power calculation procedure in the third embodiment of the transmit antenna array system according to the present invention.

FIG. 7 is a block diagram of a transmit antenna array system according to the third embodiment of the present invention and FIG. 12 is a flowchart illustrating the operation of a forward fading power calculator in the transmit antenna array system according to the third embodiment of the present invention.

Referring to FIGS. 7 and 12, the path divider 501 of the rake receiver 412 separates a reverse signal for each path, the demodulator 502 in each finger demodulates a reverse signal, and the path combiner 503 combines all finger outputs appropriately in steps 911 and 913. In step 927, the decoder 413 decodes the combined signal, thereby recovering a received message.

Meanwhile, the forward fading decoder 511 obtains forward fading information received from the mobile station with a delay of the unit time D, $\{\beta_1^F[k-D]\underline{a}(\theta_1)^H\underline{w}\}$ or $\{|\beta_1^F[k-D]\underline{a}(\theta_i)^H\underline{w}|\}$ and the forward fading extractor 512 extracts a forward fading coefficient $\beta_i[k-D]$ or $|\beta_1[k-D]|$ from the forward fading information in step 915. Here, $\{\underline{a}(\theta_1)^H\underline{w}\}$ is a value that the base station can know in advance. F represents forward, k is the current time point, and i is a path index (i=1, . . . , M). In step 917, the base station regards the forward fading coefficient $\beta_1[k-D]$ or $|\beta_1[k-D]|$ as received at the current time point despite the time delay of D and each power calculator 509 calculates a forward fading power $\{|\beta_1^F|^2\}$ for each path.

Simultaneously, each reverse fading estimator 506 estimates a reverse fading coefficient for each path from a reverse signal received from the demodulator 502, each average power calculator 507 calculates an average reverse fading power $\{E|\beta_i^R|^2\}$ for each path, and each Doppler frequency estimator 505 estimates a Doppler frequency for each path in step 919.

In step 921, a selector 510 selects $\{|\beta_1^F|^2\}$ or $\{E|\beta_i^R|^2\}$ based on the Doppler frequency. Specifically, if the Doppler frequency is less than a predetermined threshold, it is determined that the mobility of the mobile station is low in step 921 and the forward fading power $\{|\beta_1^F|^2\}$ is selected in step 923. On the other hand, if the Doppler frequency is greater than or equal to the threshold, it is determined that the mobility of the mobile station is high in step 921 and the average reverse fading power $\{E|\beta_1^{R2}|\}$ is selected and output as $\{p_i\}$ in step 925.

Each array vector calculator 423 calculates an array vector from the reverse signal of each path received from the demodulator 502. Then the transmission correlation matrix calculator 424 calculates a transmission correlation matrix G using the forward fading powers and the array vectors. The weight vector calculator 425 calculates a maximum unique vector from the transmission correlation matrix G, normalizes it, and sets the normalized maximum unique vector as a weight vector w[k] for transmission at the next time point.

Fourth Embodiment (Prediction Mixed Type)

When the feedback delay time D is rather long, the second embodiment shows good performance until the movement speed of the mobile station reaches a threshold. However, once the mobile station travels at a speed over the threshold, the performance drastically decreases. To overcome this problem, the blind forward beam formation method can be used when it is determined that the mobile station travels at a speed over the threshold. In the fourth embodiment, the prediction type and the blind forward beam formation method are selectively used according to the movement speed of the mobile station. This scheme is referred to as a prediction mixed forward beam formation method.

Figure 8:
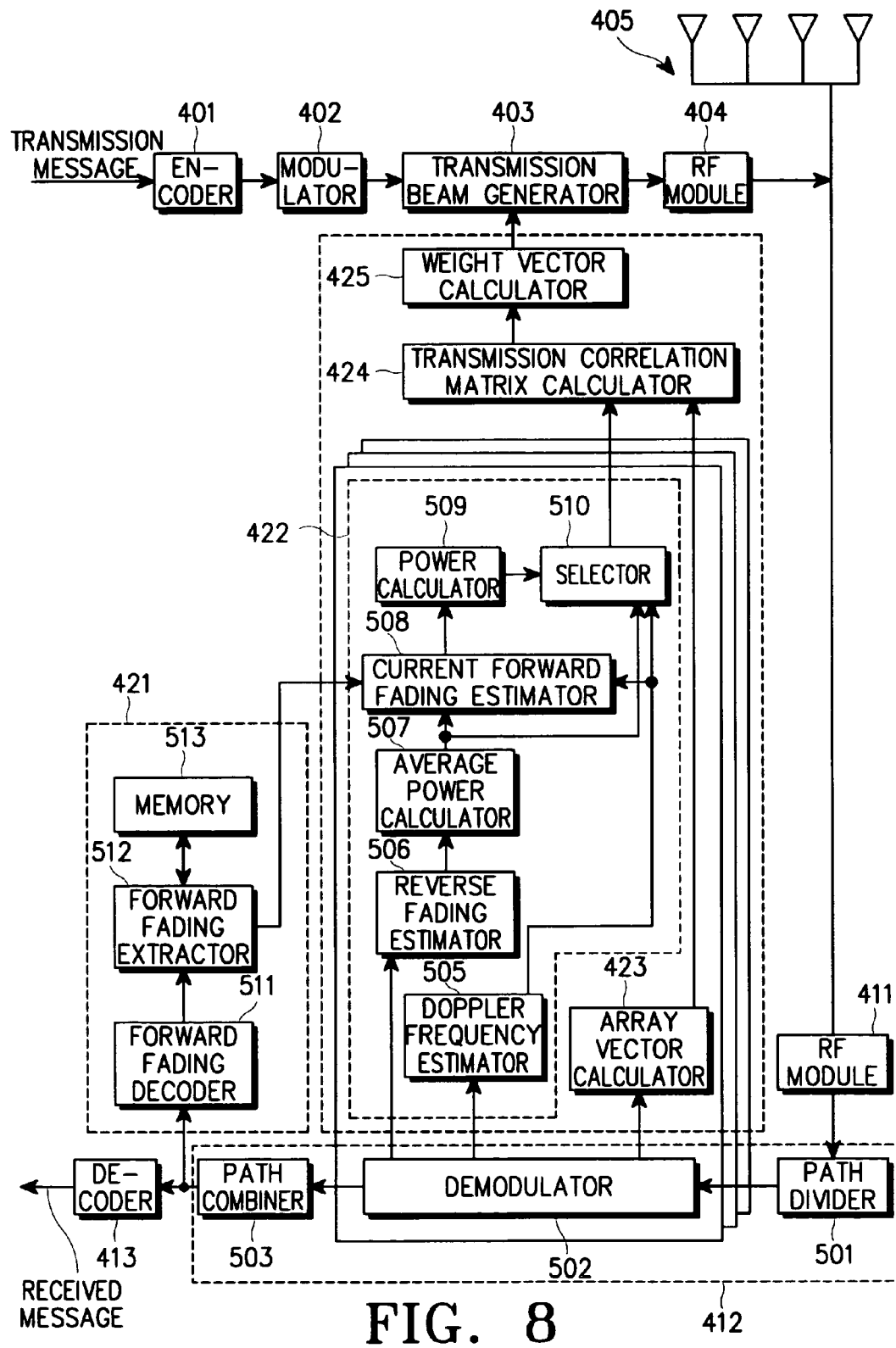
FIG. 8 is a block diagram of a fourth embodiment of the transmit antenna array system (a prediction mixed type) according to the present invention.
Figure 13:
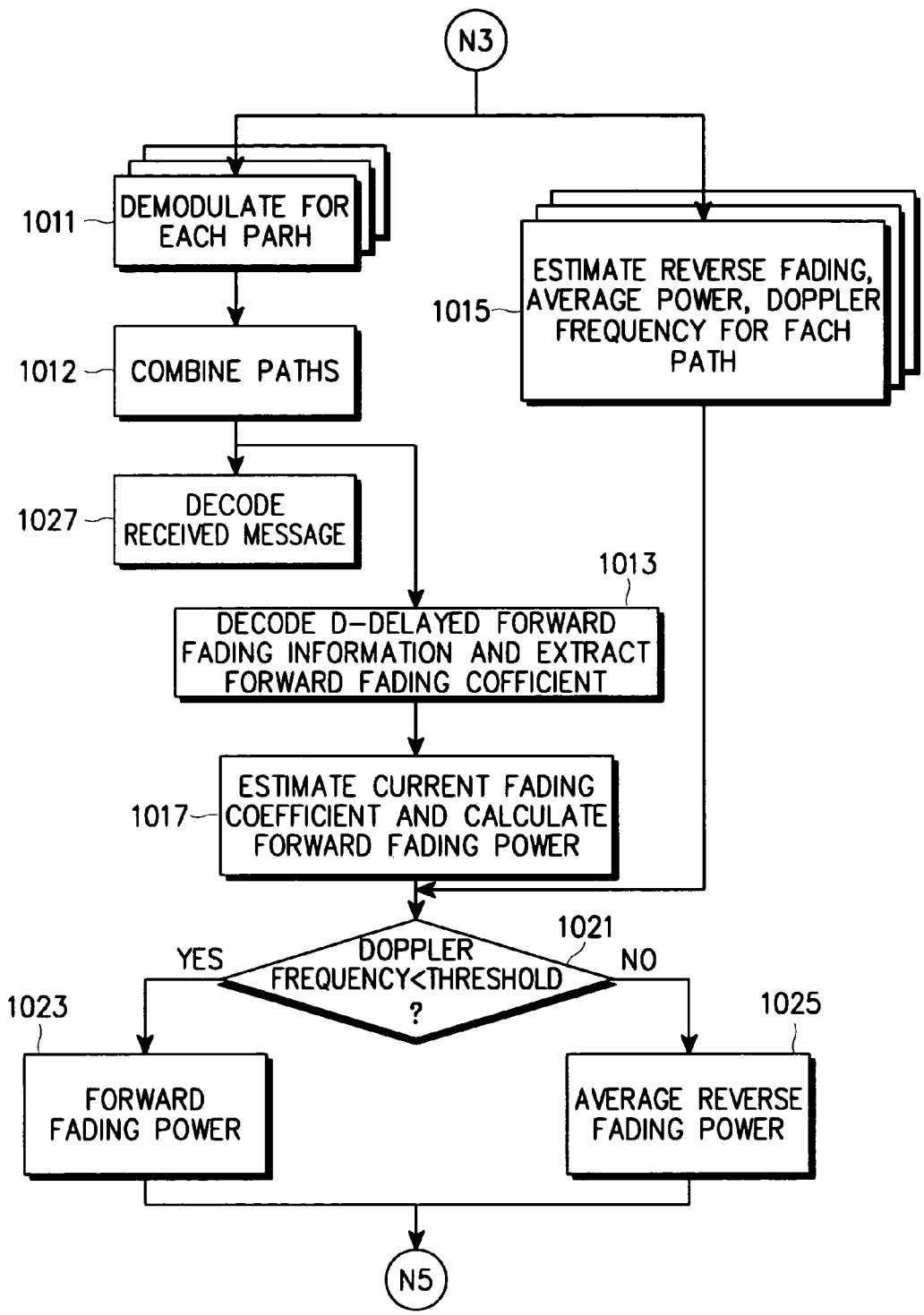
FIG. 13 is a flowchart illustrating a forward fading power calculation procedure in the fourth embodiment of the transmit antenna array system according to the present invention.

FIG. 8 is a block diagram of a transmit antenna array system according to the fourth embodiment of the present invention and FIG. 13 is a flowchart illustrating the operation of a forward fading power calculator in the transmit antenna array system according to the fourth embodiment of the present invention.

Referring to FIGS. 8 and 13, the path divider 501 of the rake receiver 412 separates a reverse signal for each path, the demodulator 502 in each finger demodulates a corresponding reverse signal, and the path combiner 503 combines all finger outputs appropriately in steps 1011 and 1012. In step 1027, the decoder 413 decodes the combined signal, thereby recovering a received message.

Meanwhile, the forward fading decoder 511 obtains forward fading information received from the mobile station with a delay of the unit time D, $\{\beta_i^F[k-D]\underline{a}(\theta_i)^H\underline{w}\}$ or $\{|\beta_1^F[k-D]\underline{a}(\theta_1)^H\underline{w}|\}$ and the forward fading extractor 512 extracts a forward fading coefficient $\beta_i[k-D]$ or $|\beta_1[k-D]|$ from the forward fading information in step 1013. The extracted forward fading coefficient is stored in the memory 513.

Simultaneously, each reverse fading estimator 506 estimates a reverse fading coefficient $\{\beta_1^R\}$ for each path from a reverse signal received from the demodulator 502, each average power calculator 507 calculates an average reverse fading power $\{E|\beta_i^R|^2\}$ for each path, and each Doppler frequency estimator 505 estimates a Doppler frequency $\{f_{D,i}\}$ for each path in step 1015.

In step 1017, each current forward fading estimator 508 receives the forward fading coefficient, the average reverse fading power, the Doppler frequency and estimates a current forward fading for each path. That is, each current forward fading estimator 508 reads the previous forward fading information from the memory 513 and forms a group of V delayed forward fading coefficients $\{\beta_i^F[k-D],\beta_i^F[k-D-1],\Lambda,\beta_i^F[k-D-V+1]\}$ or a group of V delayed forward fading severities $\{|\beta_i^F[k-D],\beta_i^F[k-D-1],\Lambda,\beta_i^F[k-D-V+1]|\}$ from the previous forward fading information.

In the case of the forward fading coefficient group, the current forward fading estimator 508 estimates the current forward fading coefficient $\{|\beta_i^F[k]|\}$ using $\{\beta_i^F[k-D],\beta_i^F[k-D-1],\Lambda,\beta_i^F[k-D-V+1]\}$, $\{E|\beta_i^R|^2\}$, and $\{f_{D,i}\}$ for the corresponding path by the linear prediction method shown in Eq. 16, Eq. 17, and Eq. 18. On the other hand, in the case of the forward fading severity group, the current forward fading estimator 508 estimates the current forward fading severity $\{|\beta_i^F[k]|\}$ using $\{\beta_i^F[k-D],\beta_i^F[k-D-1],\Lambda,\beta_i^F[k-D-V+1]\}$, $\{E|\beta_i^R|^2\}$, and $\{f_{D,i}\}$ for a corresponding path by the linear prediction method shown in Eq. 20, Eq. 21, and Eq. 22.

Each power calculator 509 calculates a forward fading power $\{|\beta_1^F|^2\}$ for each path based on the forward fading coefficient. In step 1021, the selector 510 selects $\{|\beta_1^F|^2\}$ or $\{E|\beta_1^R|^2\}$ using the Doppler frequency. Specifically, if the Doppler frequency is less than a predetermined threshold, it is determined that the mobility of the mobile station is low in step 1021 and the forward fading power $\{|\beta_i^F|^2\}$ is selected in step 1023.

On the other hand, if the Doppler frequency is greater than or equal to the threshold, it is determined that the mobility of the mobile station is high in step 1021 and $\{E|\beta_i^R|^2\}$ is selected and output as $\{p_i\}$ in step 1025.

Each array vector calculator 423 in the finger calculates an array vector from the reverse signal of each path received from the demodulator 502. Then the transmission correlation matrix calculator 424 calculates a transmission correlation matrix G using the forward fading powers and the array vectors. The weight vector calculator 425 calculates a maximum unique vector from the transmission correlation matrix G, normalizes it, and sets the normalized maximum unique vector as a weight vector w[k] for transmission at the next time point.

In the mobile communication system with a transmission antenna array device of the present invention as described above, since a mobile station feeds back forward fading information to a base station, the base station can form a transmission beam more reliably. As a result, system capacity is increased, communication quality is improved, and the transmission power of the mobile station is saved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A base station device having an antenna array, for receiving forward fading information from a mobile station in a mobile communication system, comprising:
   a reverse processor for processing a reverse signal received through the antenna array;
   a forward fading information extraction unit for extracting forward fading information from the received reverse signal;
   a beam formation controller for generating a weight vector for formation of a transmission beam using the forward fading information and the received reverse signal; and
   a forward processor having a transmission beam generator for generating a transmission beam for a transmission message based on the weight vector,
   wherein the forward fading information extraction unit comprises:
   a forward fading decoder for decoding forward fading information for each path fed back from a mobile station from the received reverse signal of the reverse processor; and
   a forward fading extractor for extracting a forward fading coefficient from the decoded forward fading information; and
   wherein if the decoded forward fading information is represented as complex information $\{\beta_i^F\underline{a}(\theta_i)^H\underline{w}, i=1, 2, \ldots, M\}$, the forward fading extractor extracts a complex forward fading coefficient $\{\beta_i^F, i=1, 2, \ldots,$ M} using a weight vector $\underline{w}$ and an estimated array vector $\{\underline{a}(\theta_i), i=1, 2, \ldots, M\}$ used for formation of the transmission beam.

2. The base station device of claim 1, wherein if the decoded forward fading information is represented as quantitative information $\{|\beta_i^F \underline{a}(\theta_i)^H \underline{w}|, i=1, 2, \ldots, M\}$, the forward fading extractor extracts a forward fading severity $\{|\beta_i^F|, i=1, 2, \ldots, M\}$ using a weight vector $\underline{w}$ and an estimated array vector $\{\underline{a}(\theta_i), i=1, 2, \ldots, M\}$ used for formation of the transmission beam.

3. The base station device of claim 1, wherein the forward fading information extraction unit further comprises a memory for storing a predetermined number of previous forward fading coefficients.

4. The base station device of claim 1, wherein the beam formation controller comprises:
a forward fading power calculator for calculating forward padding power for each path based on the extracted forward fading information;
an array vector calculator for calculating an array vector for each path from the received reverse signal;
a transmission correlation matrix calculator for calculating a transmission correlation matrix based on the forward fading powers and the array vectors; and
a weight vector calculator for calculating a weight vector from the transmission correlation matrix, updating the previous weight vector with the calculated weight vector, and outputting the updated weight vector as a control signal to the transmission beam generator.

5. The base station device of claim 4, wherein the forward fading power calculator comprises an average reverse fading power calculator for calculating an average reverse fading power for each path from the reverse signal and a Doppler frequency estimator for estimating a mobility of the mobile station, for calculating the forward fading power using the forward fading information, the reverse fading power, and the Doppler frequency according to a feedback delay time and a movement speed of the mobile station.

6. The base station device of claim 5, wherein the forward fading power calculator further comprises:
a mobility estimator for estimating the mobility of the mobile station; and
a selector for receiving the average reverse fading power for each path from the average reverse fading power calculator and the forward fading power for each path and selecting the forward fading power if the mobility is lower than a predetermined threshold and the average reverse fading power if the mobility is greater than the threshold.

7. The base station device of claim 6, wherein the mobility estimator estimates the Doppler frequency for each path $\{f_{D,i}, i=1, 2, \ldots, M\}$ from the received reverse signal.

8. The base station device of claim 4, wherein the forward fading power calculator receives the extracted forward fading coefficient for each path and outputs forward fading power for each path if a variation of the feedback time delay is small.

9. The base station device of claim 8, wherein the forward fading power calculator further comprises:
a mobility estimator for estimating the mobility of the mobile station; and
a selector for receiving the average reverse fading power for each path from the average reverse fading power calculator and the forward fading power for each path and selecting the forward fading power if the mobility is lower than a predetermined threshold and the average reverse fading power if the mobility is greater than the threshold.

10. The base station device of claim 9, wherein the mobility estimator estimates the Doppler frequency for each path $\{f_{D,i}, i=1, 2, \ldots, M\}$ from the received reverse signal.

11. The base station device of claim 4, wherein the forward fading power calculator calculates a current forward fading coefficient for each path by a predetermined prediction method using the plurality of previous forward fading coefficients for each path, an average reverse fading power for each path, and the Doppler frequency for each path if a variation of the feedback time delay is great.

12. The base station device of claim 11, wherein the forward fading power calculator calculates the current forward fading coefficient for each path $\{\beta_i^F[k], i=1, 2, \ldots, M\}$ by a predetermined linear prediction method using the plurality of previous forward fading coefficients for each path $\{\beta_i^F[k-D], \beta_i^F[k-D-1], \ldots, \beta_i^F[k-D-V+1], i=1, 2, \ldots, M\}$ (where D is a unit delay time of forward fading information between the base station and the mobile station), the average reverse fading power for each path $\{E[|\beta_i^R|^2], i=1, 2, \ldots, M\}$, and the Doppler frequency for each path $\{f_{D,i}, i=1, 2, \ldots, M\}$, and then generates the forward fading power for each path $\{p_i\}=\{|\beta_i^F|^2, i=1, 2, \ldots, M\}$.

13. The base station device of claim 11, wherein the forward fading power calculator calculates a current forward fading severity for each path $\{|\beta_i^F[k]|, i=1, 2, \ldots, M\}$ by a predetermined linear prediction method using a plurality of previous forward fading severities for each path $\{|\beta_i^F[k-D]|, |\beta_i^F[k-D-1]|, \ldots, |\beta_i^F[k-D-V+1]|, i=1, 2, \ldots, M\}$ (where D is a unit delay time of forward fading information between the base station and the mobile station), the average reverse fading power for each path $\{E[|\beta_i^R|^2], i=1, 2, \ldots, M\}$, and the Doppler frequency for each path $\{f_{D,i}, i=1, 2, \ldots, M\}$, and then generates the forward fading power for each path $\{p_i\}=\{|\beta_i^F|^2, i=1, 2, \ldots, M\}$.

14. The base station device of claim 4, wherein the array vector calculator calculates an array vector $\{\underline{a}(\theta_i), i=1, 2, \ldots, M\}$ directly from the reverse signal.

15. The base station device of claim 14, wherein the transmission correlation matrix calculator calculates a transmission correlation matrix $$G = \sum_{i=1}^{M} p_i \underline{a}(\theta_i) \underline{a}(\theta_i)^H$$

using the array vector $\{\underline{a}(\theta_i), i=1, 2, \ldots, M\}$ and the forward fading power $\{p_i, i=1, 2, \ldots, M\}$.

16. The base station device of claim 15, wherein the weight vector calculator calculates a maximum unique vector corresponding to a maximum unique value of the transmission correlation matrix, normalizes the maximum unique vector, and outputs the normalized maximum, unique vector as the weight vector.

17. The base station device of claim 16, wherein the transmission beam generator forms a transmission beam by generating as many duplication signals of a transmission message as the number of antennas in the antenna array and multiplying the duplication messages by weight vector components.

18. A transmitting method for a base station that has an antenna array and received forward fading information from a mobile station in a mobile communication system, comprising the steps of:

processing a reverse signal received through the antenna array;

extracting forward fading information from the processed reverse signal;

generating a weight vector using the forward fading information and the received reverse signal; and forming a transmission beam for a transmission message based on the weight vector, wherein if the forward fading information is represented as complex information $\{\beta_i^F \underline{a}(\theta_i)^H \underline{w}, i=1, 2, \ldots, M\}$, the forward fading extractor extracts a complex forward fading coefficient $\{\beta_i^F, i-1, 2, \ldots, M\}$ using a weight vector $\underline{w}$ and an estimated array vector $\{\underline{a}(\theta_i), i-1, 2, \ldots, M\}$ used for formation of the transmission beam; and wherein if the forward fading information is represented as quantitative information $\{|\beta_i^F \underline{a}(\theta_i)^H \underline{w}|, i=1, 2, \ldots, M\}$, the forward fading extractor extracts a forward fading severity $\{|\beta_i^F|, i-1, 2, \ldots, M\}$ using the weight vector $\underline{w}$ and an estimated array vector $\{\underline{a}(\theta_i), i-1, 2, \ldots, M\}$ used for formation of the transmission beam.

19. A communication method for a mobile station in a mobile communication system, comprising the steps of:

processing a received forward signal;

estimating forward fading information of the forward signal for each path;

combining the estimated forward fading information and encoding the combined forward fading information; and multiplexing the encoded forward fading information with a transmission message and feeding back the forward fading information in the multiplexed signal to a base station, wherein the forward fading estimator estimates complex forward fading information $\{\beta_i^F \underline{a}(\theta_i)^H \underline{w}, i=1, 2, \ldots, M\}$ from the forward signal and estimates forward fading severity information $\{|\beta_i^F \underline{a}(\theta_i)^H \underline{w}|, i=1, 2, \ldots, M\}$ from the forward signal; and wherein if the forward signal forms an omnidirectional beam, the forward fading estimator estimates the complex forward fading information $\{\beta_i^F, i=1, 2, \ldots, M\}$ and the estimates forward fading severity information $\{|\beta_i^F|, i=1, 2, \ldots, M\}$.

20. A communication method between a base station having an antenna array and a mobile station, comprising the steps of:

estimating forward fading information of a forward signal received from the base station for each path, combining the estimated forward fading information, encoding the combined forward fading information, and feeding back the encoded forward fading information to the base station in the mobile station;

extracting the forward fading information and generating a weight vector using the extracted forward fading information in the base station; and forming a transmission beam for a transmission message based on the weight vector and outputting the transmission beam through the antenna array in the base station, wherein if the forward fading information is represented as complex information $\{\beta_i^F \underline{a}(\theta_i)^H \underline{w}, i=1, 2, \ldots, M\}$, a forward fading extractor extracts a complex forward fading coefficient $\{\beta_i^F, i-1, 2, \ldots, M\}$ using a weight vector $\underline{w}$ and an estimated array vector $\{\underline{a}(\theta_i), i-1, 2, \ldots, M\}$ used for formation of the transmission beam;

wherein if the forward fading information is represented as quantitative information $\{|\beta_i^F \underline{a}(\theta_i)^H \underline{w}|, i-1, 2, \ldots, M\}$, the forward fading extractor extracts a forward fading severity $\{|\beta_i^F|, i-1, 2, \ldots, M\}$ using the weight vector $\underline{w}$ and an estimated array vector $\{\underline{a}(\theta_i), i-1, 2, \ldots, M\}$ used for formation of the transmission beam;

wherein a forward fading estimator estimates complex forward fading information $\{\beta_i^F \underline{a}(\theta_i)^H \underline{w}, i=1, 2, \ldots, M\}$ from the forward signal and estimates forward fading severity information $\{|\beta_i^F \underline{a}(\theta_i)^H \underline{w}|, i=1, 2, \ldots, M\}$ from the forward signal; and wherein if the forward signal forms an omnidirectional beam, the forward fading estimator estimates the complex forward fading information $\{\beta_i^F, i=1, 2, \ldots, M\}$ and the estimates forward fading severity information $\{|\beta_i^F|, i=1, 2, \ldots, M\}$.

* * * * *